(12) United States Patent
Kubo

(10) Patent No.: US 7,372,488 B2
(45) Date of Patent: May 13, 2008

(54) SOLID-STATE IMAGE PICKUP APPARATUS WITH HORIZONTAL THINNING AND A SIGNAL READING METHOD FOR THE SAME

(75) Inventor: Naoki Kubo, Asaka (JP)

(73) Assignee: FUJIFILM Corporation, Kanagawa (JP)

( * ) Notice: Subject to any disclaimer, the term of this patent is extended or adjusted under 35 U.S.C. 154(b) by 807 days.

(21) Appl. No.: 10/382,579

(22) Filed: Mar. 7, 2003

(65) Prior Publication Data

US 2003/0169355 A1 Sep. 11, 2003

(30) Foreign Application Priority Data

Mar. 7, 2002 (JP) .............................. 2002-061547

(51) Int. Cl.
*H04N 9/07* (2006.01)
*H04N 3/14* (2006.01)
*H04N 5/335* (2006.01)
*H04N 9/04* (2006.01)
*H04N 9/083* (2006.01)

(52) U.S. Cl. ...................... 348/266; 348/272; 348/275; 348/281; 348/294; 348/311; 348/320; 348/322

(58) Field of Classification Search ................ 348/272, 348/294, 273, 280, 322, 266, 275, 281, 311
See application file for complete search history.

(56) References Cited

U.S. PATENT DOCUMENTS 4,541,010 A 9/1985 Alston
5,852,468 A * 12/1998 Okada ........................ 348/272
6,426,493 B1 7/2002 Oda
6,686,960 B2 * 2/2004 Iizuka ........................ 348/273
7,002,630 B1 * 2/2006 Iizuka ........................ 348/322
7,057,657 B1 * 6/2006 Ishihara et al. ............. 348/312
2003/0193580 A1 * 10/2003 Okamoto .................. 348/222.1

FOREIGN PATENT DOCUMENTS

JP 2001-86519 A 3/2001
JP 2002-112119 A 4/2002

* cited by examiner

*Primary Examiner*—Lin Ye
*Assistant Examiner*—Richard M Bemben
(74) *Attorney, Agent, or Firm*—Birch, Stewart, Kolasch & Birch, LLP

(57) ABSTRACT

In a solid-state image pickup apparatus, a solid-state image sensor includes a color filter having filter segments arranged in a pattern, photosensitive cells for photoelectrically transducing light transmitted through the filter segments to generate corresponding signal charges, vertical transfer devices for vertically transferring the signal charges, a horizontal transfer device for transferring the signal charges input from the vertical transfer devices in the horizontal direction, and a charge holding circuit intervening between the vertical and horizontal transfer devices for temporarily storing the signal charges. A signal charge thinning circuit omits signal charges whose color pattern, which is generated by mixing signal charges having the same color attribute in the direction of row in the filter pattern to thereby horizontally thin the signal charges, is different in positional relation from the filter pattern.

4 Claims, 31 Drawing Sheets

Fig. 5
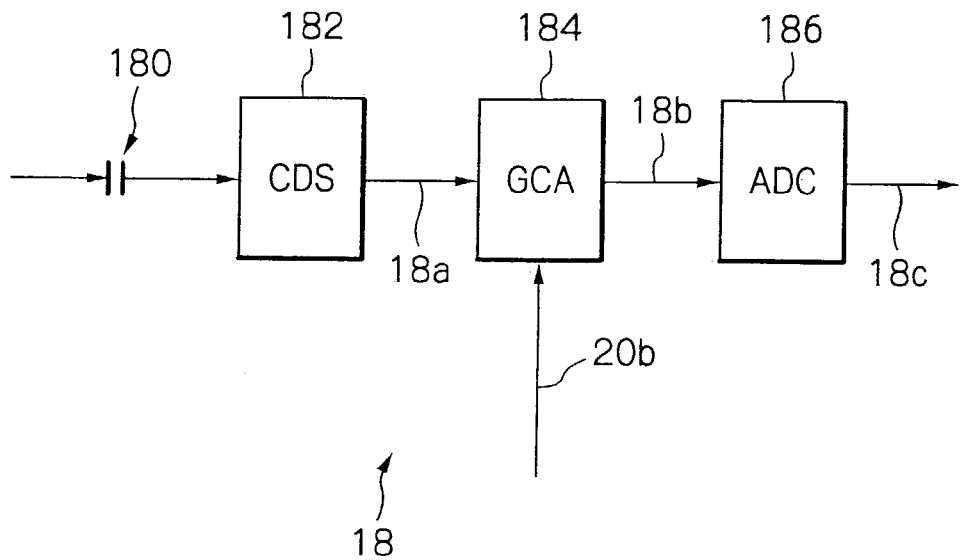
Fig. 6A HORIZONTAL MIXTURE
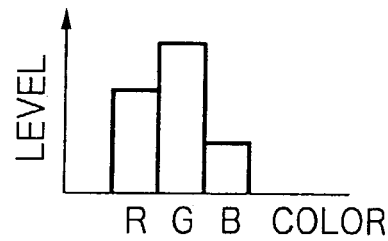
Fig. 6B HORIZONTAL THINNING MIXTURE
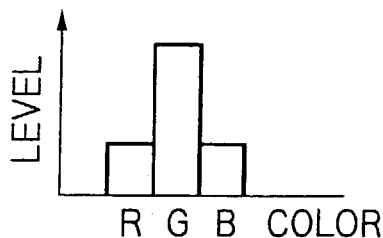
Fig. 6C LEVEL ADJUSTMENT
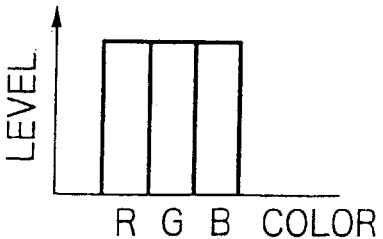

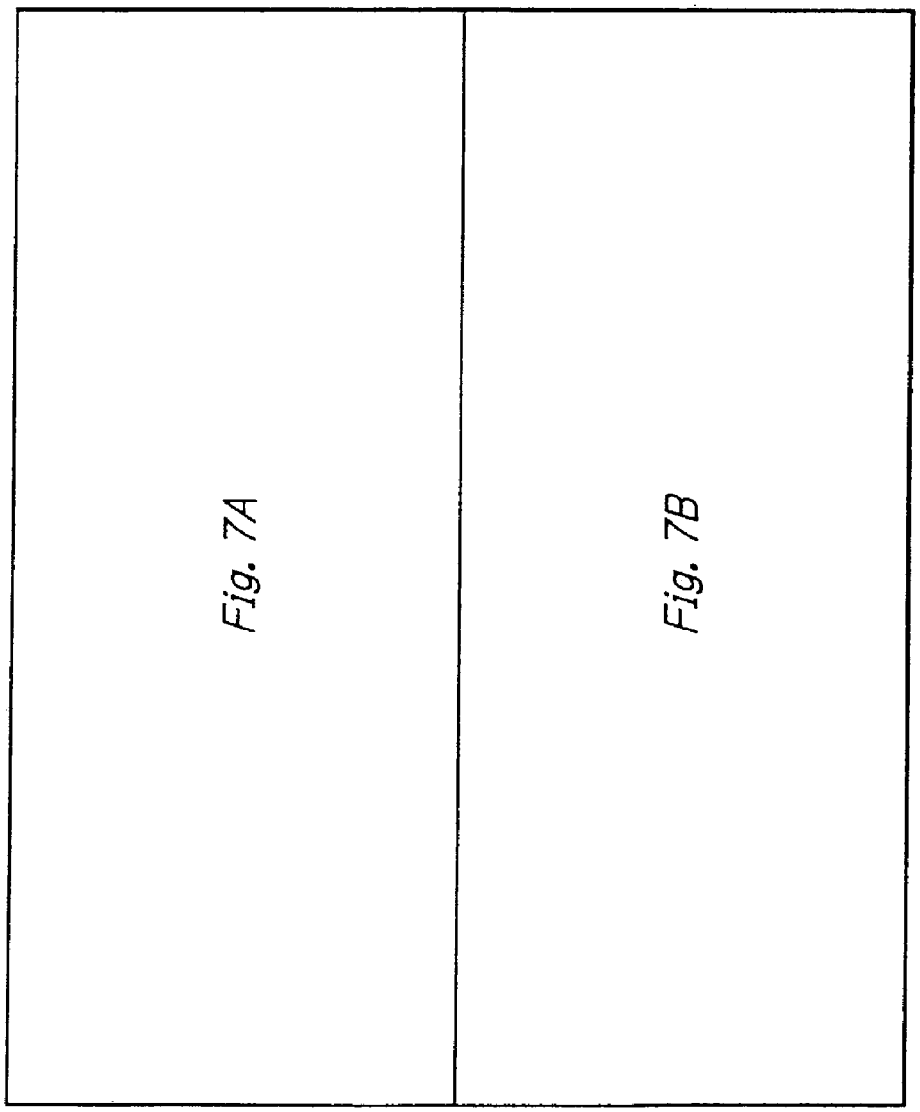

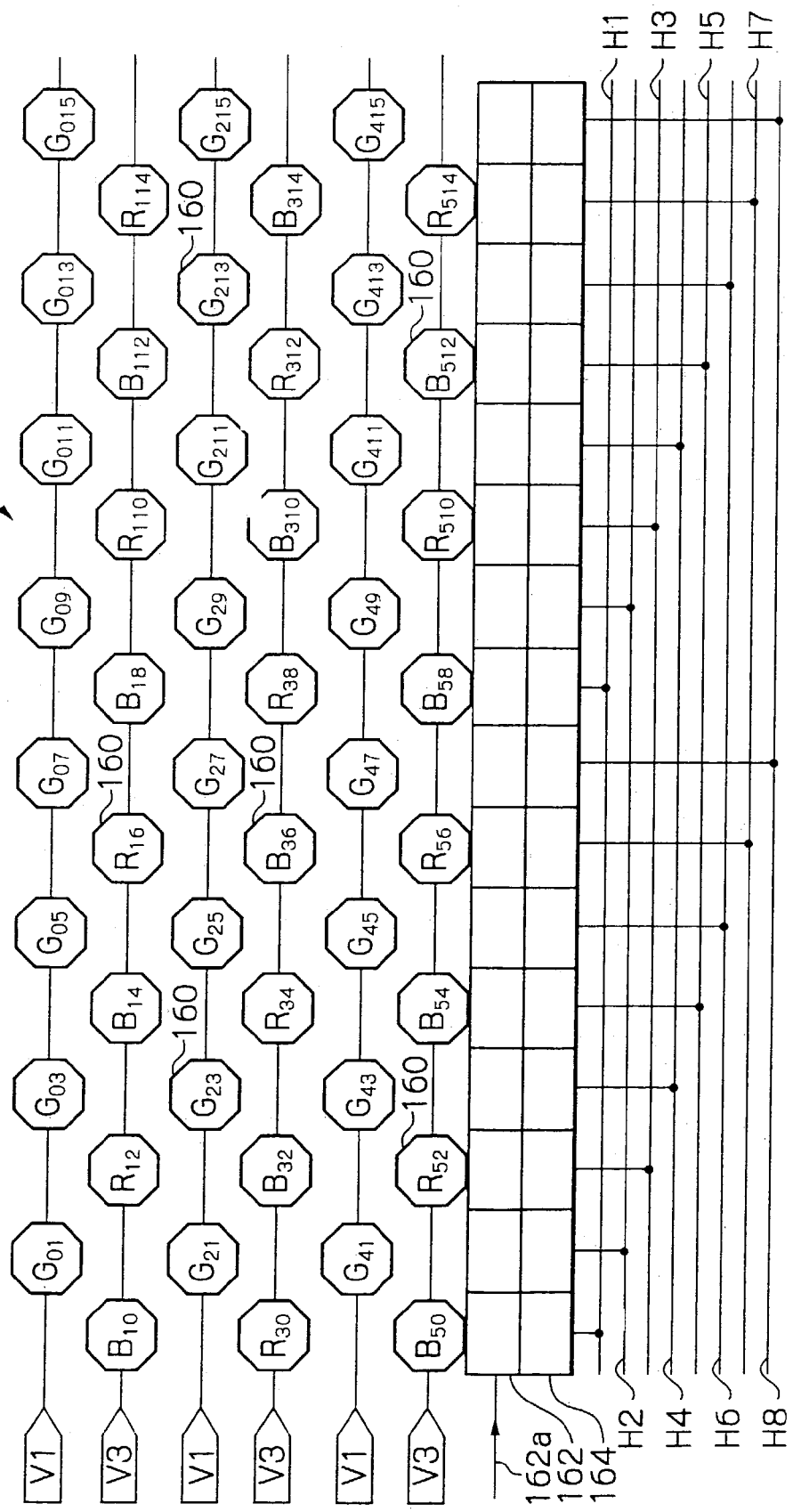

Fig. 11

|   | B |   | R |   | B |   | R |
|---|---|---|---|---|---|---|---|
| G |   | G |   | G |   | G |   |
|   | R |   | B |   | R |   | B |
| G |   | G |   | G |   | G |   |
|   | B |   | R |   | B |   | R |
| G |   | G |   | G |   | G |   |
|   | R |   | B |   | R |   | B |
| G |   | G |   | G |   | G |   |
|   | B |   | R |   | B |   | R |
| G |   | G |   | G |   | G |   |
|   | R |   | B |   | R |   | B |
| G |   | G |   | G |   | G |   |
|   | B |   | R |   | B |   | R |
| G |   | G |   | G |   | G |   |
|   | R |   | B |   | R |   | B |
| G |   | G |   | G |   | G |   |

| G | | G | | G | | G | |
| --- | --- | --- | --- | --- | --- | --- | --- |
| | B | | R | | B | | R |
| G | | G | | G | | G | |
| | R | | B | | R | | B |
| G | | G | | G | | G | |
| | B | | R | | B | | R |
| G | | G | | G | | G | |
| | R | | B | | R | | B |
| G | | G | | G | | G | |
| | B | | R | | B | | R |
| G | | G | | G | | G | |
| | R | | B | | R | | B |

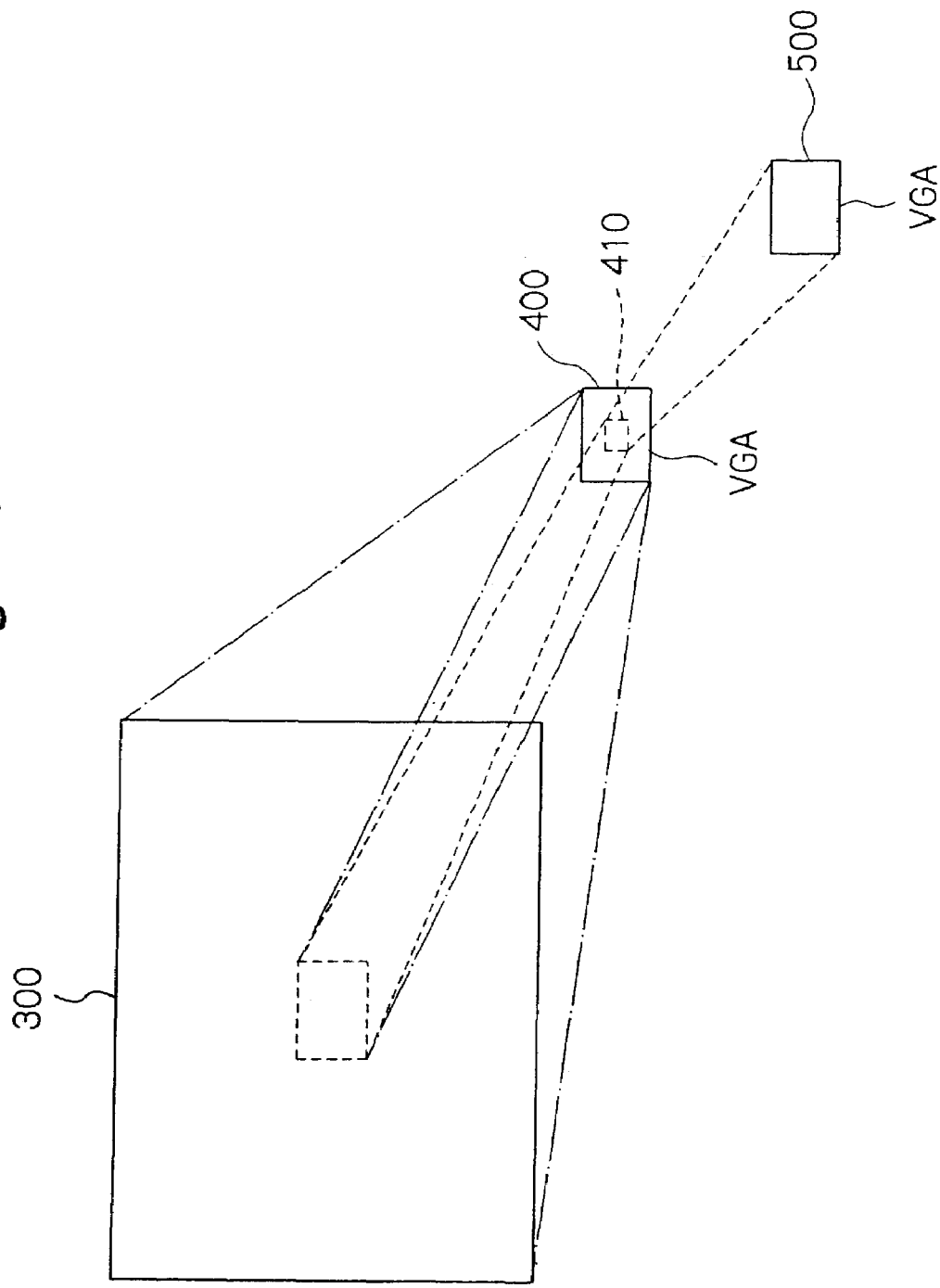

SOLID-STATE IMAGE PICKUP APPARATUS WITH HORIZONTAL THINNING AND A SIGNAL READING METHOD FOR THE SAME

BACKGROUND OF THE INVENTION

1. Field of the Invention

The present invention relates to a solid-state image pickup apparatus advantageously configured to horizontally mix signal charges read out from photosensitive cells for thereby thinning pixels, and a signal reading method for the same.

2. Description of the Background Art

A digital camera, for example, includes an area or bidimensional image sensor for picking up a desired scene. Recently, a high-resolution area image sensor having as many as several million photosensitive cells for electric transduction, i.e. pixels, has been put on the market for implementing higher image quality. While a camera mode or still picture mode and a movie mode are available with a digital camera, image pickup in the movie mode is periodically effected at preselected time intervals in order to display consecutive frames in the form of movie. The movie mode is sometimes referred to as a monitor mode in the sense that the operator of the camera uses it when determining which scene is viewed into a still picture.

If signal charges captured by and stored in the high-resolution area image sensor in its monitor are directly read out, then the reading operation may not complete within the preselected period of time. In light of this, it is a common practice to limit the number of pixels to be read out to one that can be followed. More specifically, signal charges are read out from a plurality of photosensitive cells arranged in lines extending in the horizontal direction of a picture frame, or the direction of row, and then mixed or added in the vertical direction. The vertical addition of the signal charges increases the amount of signal charges, so that pickup sensitivity is enhanced in dependence upon the amount of signal charge.

To allow the area image sensor to pickup a color image, a color filter is positioned on the array of photosensitive cells of the image sensor for separating incident light into different color components. Generally, as for a digital still camera, a single color filter is assigned to a single image sensor and has color filter segments arranged in one-to-one correspondence to the photosensitive cells. Therefore, in a digital still camera with a single color filter, signal charges derived from the photosensitive cells associated with the color filter segments of the same color are mixed in the vertical direction. Such vertical thinning, however, lowers the vertical resolution of a picture.

In the future, area image sensors having a further increased number of pixels may be required to cope with reading out signal charges in the monitor mode. Then, consideration may be given not only to vertical mixture but also to horizontal mixture. In this respect, Japanese patent laid-open publication No. 2001-86519, for example, teaches a solid-state image pickup apparatus paying attention to a positional relation between lines to be mixed. The image sensor taught in this document generates, e.g. three primary colors R (red), G (green) and B (blue) out of color-mixed signals output from an area image sensor and then executes sophisticated calculations for special image processing with the color mixed-signals later.

Horizontal thinning in the area image sensor mixes pixels in the horizontal direction, so that the resulting pixel signals constitute a pixel space, or image, of new colors. The pixel space is obviously representative of a color space different from the conventional pixel positions and unbalanced in pixel arrangement. Should the conventional signal processing be executed with such an unbalanced pixel arrangement without the special image processing mentioned above, vertical stripes, false colors and other image defects would appear in the resulting picture, degrading image quality.

In the image pickup apparatus disclosed in laid-open publication No. 2001-86519 mentioned earlier, the colors must be mixed in a particular condition determined by a procedure used for reproducing the colors R, G and B from image data derived from the horizontal mixture. The limited condition available for color mixture will be problematic when higher signal reading speed is desired.

SUMMARY OF THE INVENTION

It is an object of the present invention to provide a solid-state image pickup apparatus capable of implementing high-quality pictures despite horizontal mixture and promoting more rapid, flexible read-out of signal charges, and a signal reading method for the same.

A solid-state image pickup apparatus of the present invention includes a solid-state image sensor, and a drive signal generator. The image sensor includes a color filter having color filter segments arranged in a pattern for separating light incident from a scene into respective colors, photosensitive cells associated one-to-one with the color filter segments each for photoelectrically transducing the light transmitted through the associated color filter segment to thereby generate a corresponding signal charge, gates each being configured to be selectively closed for storing the signal charge having a color attribute corresponding to the associated color filter segment in the associated photosensitive cell or opened for reading out the signal charge, first transfer devices adjoining the gates for vertically transferring the signal charges via the gates, a second transfer device for transferring the signal charges in the horizontal direction, a charge holding circuit intervening between the bottom stages of the first transfer devices and the second transfer device for temporarily storing the signal charges fed from the bottom stages, and a signal charge thinning circuit omitting signal charges whose color pattern, which is generated by mixing the signal charges having the same color attribute in the direction of row in the pattern of the color filter to thereby thin the signal charges in the horizontal direction, is different in positional relation from the pattern of the color filter. The drive signal generator generates drive signals for selectively opening or closing the gates, drive signals for the first and second transfer devices, read signals for reading out the signal charges held in the charge holding circuit, and thinning drive signals for the signal charge thinning circuit.

Also, a signal reading method of the present invention begins with a step of separating light incident from a scene being picked up into color components with color filter segments to thereby generate corresponding signal charges each having a particular color attribute. When the signal charges of the same color are mixed in the horizontal direction as pixels, horizontal-mixture reading is executed that includes thinning for omitting the signal charges whose color pattern resulting from the horizontal-mixture reading is different in position from the a pattern in which the color filter segments are arranged. Subsequently, the levels of the signal charges produced by the thinning are adjusted in accordance with the number of pixels used to generate the signal charges by the horizontal mixture and indicative of the pattern of the color filter segments.

BRIEF DESCRIPTION OF THE DRAWINGS

The objects and features of the present invention will become more apparent from consideration of the following detailed description taken in conjunction with the accompanying drawings in which:

FIG. 5 is a schematic block diagram showing a specific configuration of a preprocessor included in the illustrative embodiment;

FIGS. 6A, 6B and 6C are graphs demonstrating level adjustment effected color by color in consideration of horizontal thinning mixture executed by the preprocessor of FIG. 5;

FIG. 7 shows how

FIGS. 7A and 7B are, when combined as shown in FIG. 7, a timing chart useful for understanding a specific operation of the photosensitive cells of FIG. 2;

FIG. 8 schematically shows part of a comparative example of the arrangement of photosensitive cells;

FIGS. 9A and 9B are, when combined as shown in FIG. 9, a timing chart useful for understanding a specific operation of the comparative example of FIG. 2;

FIG. 11 schematically shows 8×8 blocks each constituting a unit block in the G square, RB full-checker pattern of FIG. 2;

FIG. 14 schematically shows 8×12 blocks representative of the G square, RB full-checker pattern of FIG. 2;

FIG. 21 schematically shows a G stripe, RB full-checker pattern applied to the color filter of FIG. 2;

FIGS. 25A and 25B are, when combined as shown in FIG. 25, a timing chart useful for understanding a specific operation of the alternative embodiment;

FIG. 27 schematically demonstrates how the digital camera of FIG. 1 selectively performs usual horizontal mixture or thinning horizontal mixture.

DESCRIPTION OF THE PREFERRED EMBODIMENTS

Figure 1:
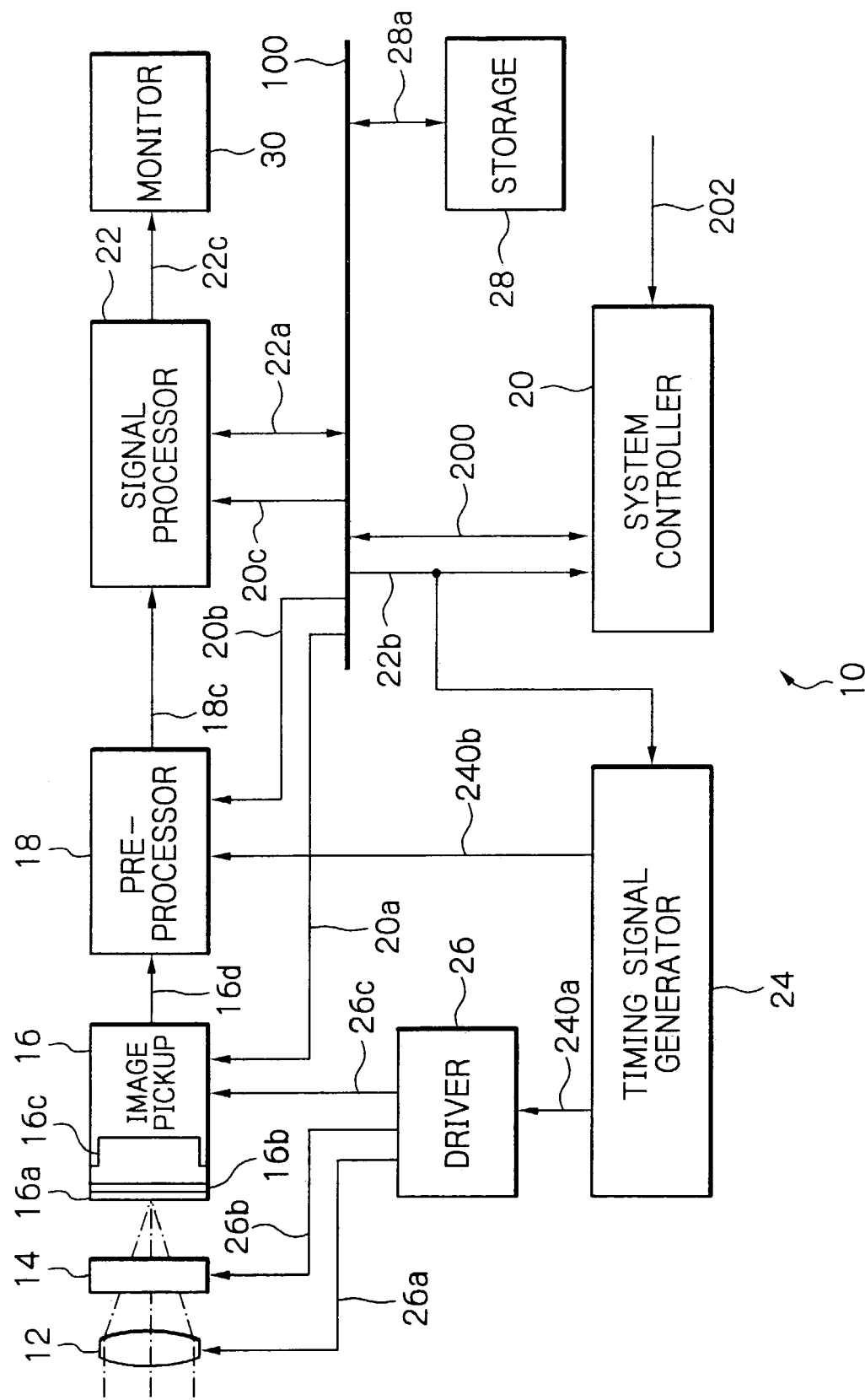
FIG. 1 is a schematic block diagram showing a solid-state image pickup apparatus embodying the present invention and implemented as a digital camera by way of example.

Referring to FIG. 1 of the drawings, a solid-state image pickup apparatus embodying the present invention is implemented as a digital camera by way of example. It is to be noted that parts of the digital camera not relevant to the understanding of the present invention are not shown or described. Signals appearing in the illustrative embodiment are designated by reference numerals attached to connections on which they appear.

As shown in FIG. 1, the digital camera, generally 10, includes a lens system 12, an iris diaphragm mechanism 14, an image pickup section 16, a preprocessor 18, a system controller 20, a signal processor 22, a timing signal generator 24, a driver 26, a storage 28, and a monitor 30. The lens system 12 is implemented as, e.g. a combination of optical lenses and focuses a light beam incident thereto via the iris diaphragm mechanism 14 on the image pickup section 16. The lens system 12 includes an AF (Automatic Focus) mechanism and an AE (Automatic Exposure) mechanism although not shown specifically. During preliminary pickup preceding an actual shot, the AV mechanism determines a range between a subject to be picked up and the camera 10 and then focuses the camera 10 on the subject in accordance with the determined range. The AE mechanism adjusts the quantity of incident light during the preliminary pickup. The AF and AE mechanisms are operated by drive signals output from a driver 26, which will be described later.

The iris diaphragm mechanism 14 causes its ring portion, not shown, to rotate in response to a drive signal received from the driver 26. More specifically, the ring portion includes a plurality of blades overlapping each other to form a circular iris, so that an incident light beam is restricted by the iris. The radius of the iris is controlled by the drive signal mentioned above. The iris diagram mechanism 14 may include a mechanical shutter, not shown, as a lens shutter, if desired.

Figure 2:
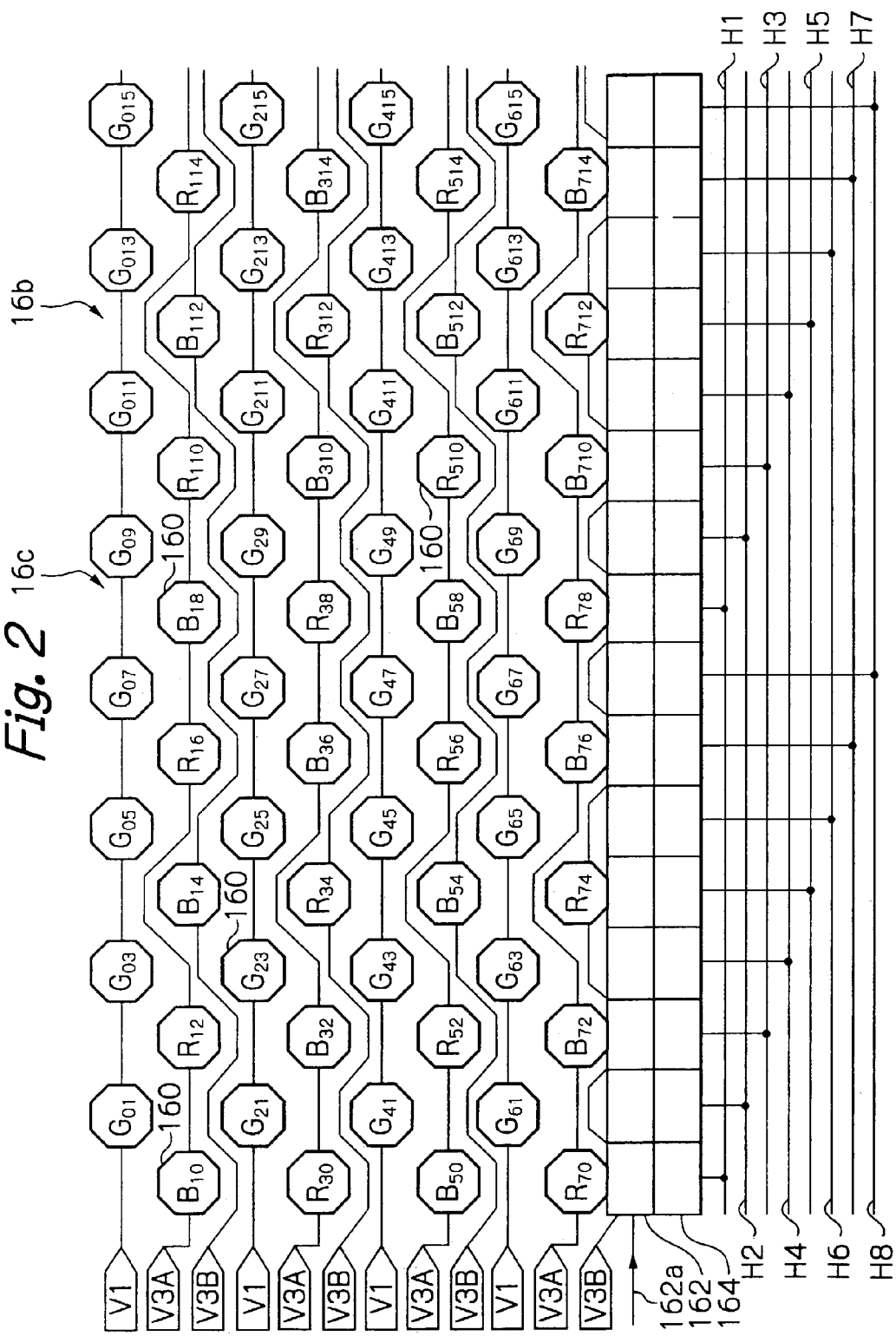
FIG. 2 schematically shows part of the arrangement of photosensitive cells included in the illustrative embodiment.

The image pickup section 16 includes an optical low-pass filter 16a, a color filter 16b, and a solid-state image sensor 16c. The optical low-pass filter 16a filters out the spatial frequencies of incident light above the Nyquist frequency. The color filter 16b has filter segments of, e.g. three primary colors R, G and B arranged in one-to-one correspondence to photosensitive cells that constitute an array of photosensitive cells of the image sensor 16c. The color filter 16b is therefore dependent on the arrangement of the photosensitive cells of the image sensor 16c. For example, assume that the photosensitive cells of the image sensor 16c are arranged in a so-called honeycomb pattern in which pixels are shifted from each other by half a pitch in the horizontal and vertical directions. Then, there may be used a G square, RB full-checker pattern shown in FIG. 2. In FIG. 2, G filter segments adjacent each other are arranged in a square lattice, one R or B filter segment is positioned at the center of the square lattice, and filter segments of the same color as the one R or B filter segment diagonally face the one R or B filter segment with the intermediary of the G filter segments.

The honeycomb pattern applied to the color filter 16c may be replaced with a Bayer pattern, G stripe, RB full-checker pattern or similar square lattice pattern, if desired. In the Bayer pattern, for example, either one of two diagonally opposite pairs of filter segments are implemented by G filter segments while the other pair of filter segments are implements by R and B filter segments. Further, in the G stripe, RB full-checker pattern, G filter segments are arranged in a vertical array or stripe, R and B filter segments are positioned at both sides of the G filter segments array, and filter segments of the same color are positioned to diagonally face each other on nearby two rows.

The R, G and B color filter may, of course, be replaced with a color filter of complementary colors, in which case an extra step of converting complementary colors to primary colors will be added to signal processing to follow.

In the illustrative embodiment, the image sensor 16c is implemented as a CCD (Charge-Coupled Device) image sensor shown in FIG. 2 specifically. The image sensor 16c photoelectrically transduces light incident thereto via the lens system 12 and the iris of the iris diaphragm mechanism 14 to signal charges. In FIG. 2, pixels are arranged with a pitch in the column or vertical direction, or the row or horizontal direction in such a fashion that the pixels on nearby columns or rows are shifted from each other by half the pitch in the vertical or the horizontal direction, respectively, as illustrated. Although gates and vertical transfer registers included in the image sensor 16c are not shown in FIG. 2, drive signals are fed to such gates and registers via electrodes V1, V3A and V3B in order to open or close the gates and transfer signal charges input to the gates.

More specifically, in a still-picture read mode, drive signals are applied to the electrode V1 and electrodes V3A and V3B for reading out signal charges stored by exposure and transferring them toward horizontal transfer registers. In a horizontal-thinning read mode, drive signals are applied to the electrodes V1 and V3A for reading out signal charges stored by exposure and transferring them toward the horizontal transfer registers. At the same time, a drive signal that inhibits the read-out of signal charges is applied to the electrode V3B because when signal charges are horizontally mixed in accordance with horizontal thinning, pixels are generated at positions different from the color pattern of the color filter 16b, as will be described in detail later. This is why the image sensor 16c is provided with two different electrodes V3A and V3B.

In FIG. 2, the image sensor 16c is wired such that the photosensitive cells on the fifth and thirteenth columns from the left each are driven independently of the other photosensitive cells arranged in the direction of row. Wiring on the first row connects the electrode V3B and photosensitive cells B14, B112 and so forth. Wiring on the third row connects the electrode V3B and photosensitive cells R34, R312 and so forth. In this configuration, photosensitive cells 160 on the zero-th column are not mixed in the horizontal direction, but are left as they are. On the other hand, in the photosensitive cells 160 on the fifth column, there are generated signal charges with a color attribute different from the original color which is expected to be read out by the horizontal mixture of signal charges of the same color on the second and sixth columns. On the third line, for example, the original colors B14 and B112 are replaced with colors R34 and R312, respectively.

A line memory 162 is arranged in the horizontal direction perpendicular to the vertical direction in which the vertical transfer registers transfer the signal charges. The line memory 162 is made up of storage cells corresponding one-to-one to the vertical transfer registers. The line memory 162 is formed with input/output gates for holding or reading out the signal charges. Horizontal transfer registers 164 are arranged in an array parallel to the line memory 162, and each corresponds to one of the memory cells of the line memory 162. As shown in FIG. 2, horizontal drive signals H1 through H8 each are fed to particular one of the horizontal transfer registers 164 in order to form a potential well and causes a signal charge to be transferred in accordance with the configuration of the potential well. The signal charges horizontally transferred are mixed in the horizontal direction and then input to an output amplifier section 166, see FIG. 3.

Thinning horizontal mixture available with the image sensor 16c will be described in detail later. Thinning horizontal mixture differs from simple horizontal mixture in that it omits signal charges output from photosensitive cells, which would bring about errors, in order to attain a pattern identical with the original pattern of the color filter 16b despite even when horizontal thinning is effected.

Figure 3:
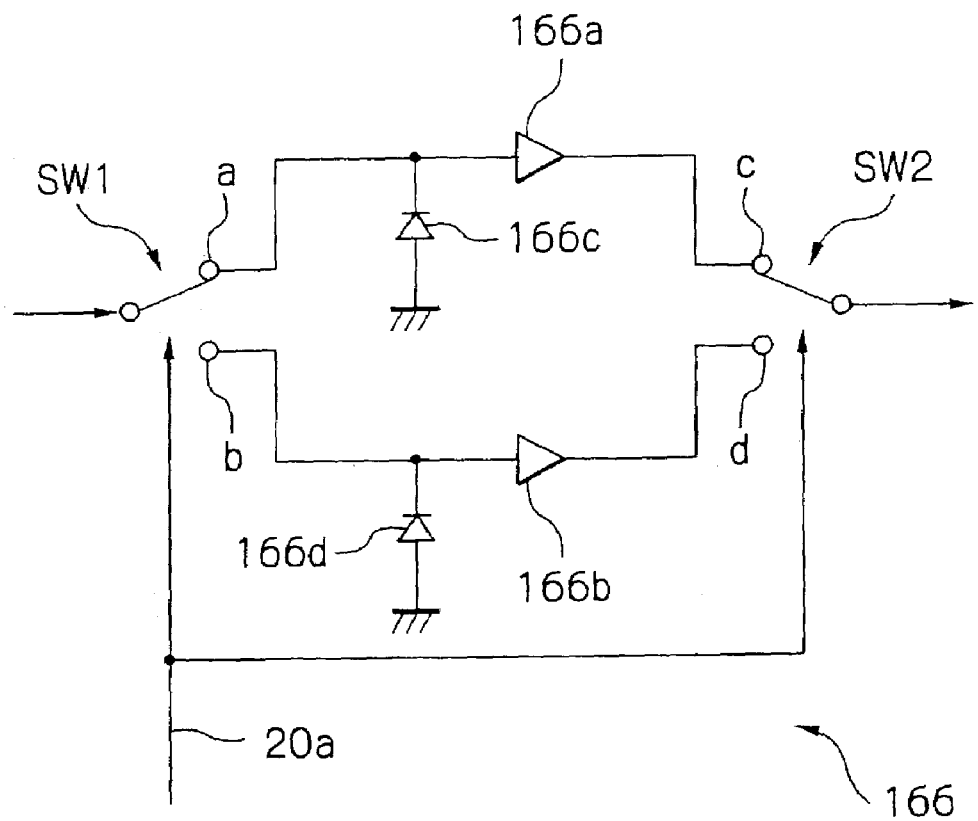
FIG. 3 is a schematic circuit diagram showing a specific configuration of an output amplifier associated with the photosensitive cells of FIG. 2.

In FIG. 3, the output amplifier section 166 includes a FDA (Floating Diffusion Amplifier) that converts an input signal charge (Q) to a corresponding voltage signal (V). In an application in which the output amplifier section 166 has a level adjusting function, FIG. 3 shows a specific configuration of the output amplifier section 166. As shown, the output amplifier section 166 includes switches SW1 and SW2 and amplifiers 166a and 166b. The switches SW1 and SW2 cooperate to switch the gain of the signal level in response to a control signal 20a output from the system controller 20. The amplifier 166a amplifies signal charges mixed in the horizontal direction. The amplifier 166b increases the gain of the signal charges read out by horizontal thinning mixture in accordance with the number of pixels to be mixed in the horizontal direction. The switch SW1 has terminals a and b connected to the inputs of the amplifiers 166a and 166b, respectively. The switch SW2 has terminals c and d connected to the outputs of the amplifiers 166a and 166b, respectively. The switches SW1 and SW2 are operated in unison in synchronism with the control signal 20a. Diodes 166c and 166d are connected in parallel to a signal line connecting the terminal a of the switch SW1 and the input of the amplifier 166a and a signal line connecting the terminal b of the switch SW1 and the input of the amplifier 166b, respectively, in order to clamp the base level position of the signal level.

Figure 4:
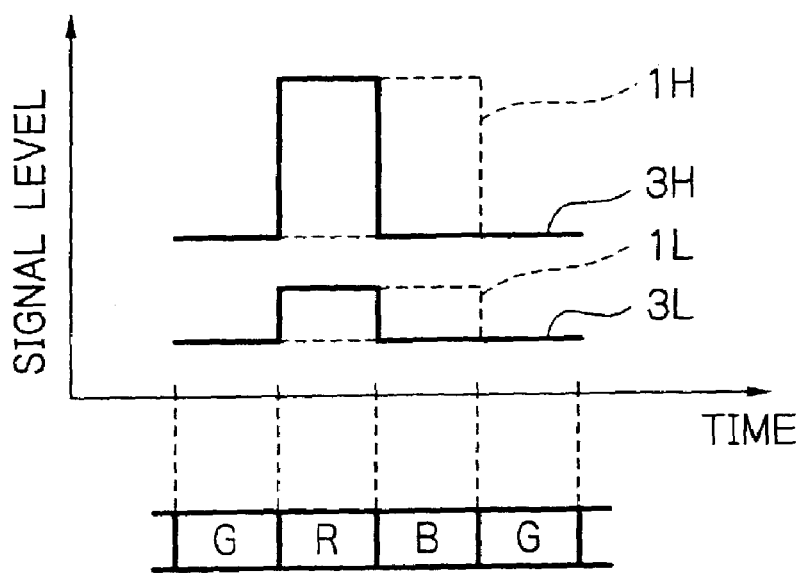
FIG. 4 is a graph showing the variation of a signal level occurring in accordance with the operation of the output amplifier.

More specifically, the switch SW1 is operated by the control signal 20a in accordance with whether or not signal charges input thereto have been subjected to horizontal mixture. FIG. 4 is a graph showing solid lines 3H and 3L representative of, among signal charges G, R, B, G and so forth sequentially input to the switch SW1, signal charges read out from the third row of FIG. 2 by way of example. As for the color $R_{30}$, a signal charge derived from horizontal thinning is used and therefore amplified by a gain two times as high as a gain assigned to the other colors. Also shown in FIG. 4 are dashed lines 1H and 1L representative of signal charges read out from the first row of FIG. 2; a signal charge derived from the color $B_{18}$ is also amplified by the gain two times as high as the gain assigned to the other colors.

As stated above, the image pickup section 16 feeds the preprocessor 18 with a signal 16d subjected to Q/V conversion at the image sensor 16c as an image signal.

FIG. 5 shows a specific configuration of the preprocessor 18. The preprocessor 18 includes a capacitor 180, a correlated double sampling (CDS) circuit 182, a gain-controlled amplifier (GCA) 184, and an analog-to-digital converter (ADC) 186 interconnected as shown. The capacitor 180 removes DC components from the image signal 16d input from the image pickup section 16 and feeds the resulting image signal 16d to the CDS circuit 182. The CDS circuit 182 removes low-frequency noise components from the image signal 16d to thereby output a noise-free image signal 18a.

The gain-controlled amplifier 184 is adapted to amplify the noise-free image signal 18a in response to a control signal 20b output from the system controller 20 for thereby outputting a wave-shaped image signal 18b. More specifically, in an application where the output amplifier section 166 of the image sensor 16c does not adjust the output level in accordance with whether or not horizontal mixture has been effected, the gain-controlled amplifier 184 performs not only the gain adjustment for wave-shaping mentioned above, but also level adjustment with signal levels directly derived from exposure. The level adjustment will be briefly described with reference to FIGS. 6A, 6B and 6C.

As shown in FIG. 6A specifically, in the case of simple horizontal mixture, the level of the individual color reflects the signal level derived from the horizontal mixture. However, as shown in FIG. 6B, when signal charges are inhibited from being read out from particular rows of photosensitive cells as in the illustrative embodiment, the signal level of the color R is halved. In light of this, to equalize the levels of the signals of different colors, the gain-controlled amplifier 184 executes level adjustment in consideration of the signal level derived from horizontal thinning mixture for thereby feeding to the analog-to-digital converter 186 the analog signal 18b in which the signals of different colors are of the same level, as shown in FIG. 6C.

The analog-to-digital converter 186 is adapted to convert the input analog signal 18b to corresponding image data, or digital signal, 18c and feed the image data 18c to the signal processor 22.

Referring again to FIG. 1, the signal processor 22 is implemented as an RISC (Reduced Instruction Set Computer) processor chip including a signal generator (SG), a memory, a gamma corrector, an estimated value calculator, a pixel interpolator, a matrix processor, and a compander, although not shown specifically. The signal generator, operating in response to a control signal 20c output from the system controller 20, includes a PLL (Phase-Locked Loop) circuit adapted for generating a plurality of different frequencies. The signal generator may generate a clock signal by multiplying the frequency of a reference clock signal output from an oscillator by an integer, if desired. The signal processor 22 delivers the clock signal to the system controller 20 and timing signal generator 24 via a bus line 22a, a system bus 100, and a signal line 22b.

In an application where horizontal mixture is executed with two pixels, and the image sensor 16c and preprocessor 18 effect level adjustment without distinguishing pixel data subjected to horizontal thinning, but not to horizontal mixture, and pixel data subjected to both of them, a selecting and shifting circuit configured to select the pixel data subjected to horizontal thinning, but not to horizontal mixture, and effect bit shift therewith should preferably be positioned at the input stage of the signal processor 22. The selecting and shifting circuit can therefore double only the pixel data to be shifted in bit, allowing low pixel data levels ascribable to horizontal thinning to be easily corrected. It is to be noted that when the number of pixels to be subjected to horizontal mixture is 2n (n being a natural number) instead of two, the selecting and shifting circuit can correct pixel data by shifting them by n bits.

The memory temporarily stores the digital image data 18c or, in the specific application described above, the image data including the level-adjusted pixel data output from the selecting and shifting circuit. In any case, the image data read out from the memory are input to the gamma corrector. In an application in which image data are repeatedly read out from the memory, the memory should preferably be implemented as a nonvolatile memory. The gamma corrector, including a lookup table for gamma correction by way of example, executes gamma correction with the input image data as one of preprocessing steps that precede the actual image processing stage. The gamma-corrected image data output from the gamma corrector are delivered to the estimated value calculator and pixel interpolator.

The estimated value calculator includes a circuit for calculating a lens aperture or f-stop number, a shutter speed, a WB (White Balance) adjustment value and a tone or gray scale correction value. With this circuit, the estimated value calculator calculates adequate parameters on the basis of the image data and feeds them to the system controller 20 via the data bus 22a, the system bus 100, and a bus 200 for control and data. If desired, the estimated value calculator may be included in the system controller 20, in which case the gamma-corrected image data will be fed to the system controller 20.

The pixel interpolator is configured to generate pixel data by interpolation and to broaden the frequency band of the generated pixel data. More specifically, because the image pickup section 16 uses a single color filer 16b, colors other than those of the actual filter segments are not available with the photosensitive cells. The pixel interpolator generates pixel data of the unavailable colors by interpolation. Further, the pixel interpolator broadens the frequency band of the pixel data of the actual colors and interpolated colors, i.e. raises their frequency. The resulting plain image data are delivered to the matrix processor.

In an application in which the image sensor 16c included in the image pickup section 16 is of the honeycomb type, the pixel interpolator is adapted to interpolate R, G and B image data in the positions where pixels are actually present and absent (actual and virtual pixels, respectively) in accordance with the gamma-corrected image data.

The matrix processor produces luminance data Y and color difference data $C_b$ and $C_r$ from the plain image data input from the pixel interpolator. The luminance data Y and color difference data $C_b$ and $C_r$ are fed to the compander.

The compander is adapted to compress, in the actual pickup mode, the image data, i.e. the luminance data Y and color difference data $C_b$ and $C_r$ in accordance with, e.g. JPEG (Joint Photographic Experts Group) standards. The compressed image data are written to the storage 28 via the data bus 22*a*, the system bus 100, and a bus 28*a*. Also, the compander expands the image data read out from the storage 28 via the bus 28*a*, system bus 100, and data bus 22*a*. The expanded image data Y, $C_b$ and $C_r$ are converted to analog signals within the signal processor 22 and then fed to the monitor 30 as reproduced image signals 22*c*.

The system controller 20 is implemented by a microcomputer or a CPU (Central Processing Unit) and adapted to control the sections of general use and digitizing sections included in the camera 10 in response to a trigger signal 202 fed from a key input section not shown. The trigger signal 202 includes a timing signal, a mode signal, and a selection signal. More specifically, the system controller 20 controls the preprocessor 18 and signal processor 22 with control signals 20*b* and 22*c*, respectively, over the bus 200. Further, the system controller 20 feeds a control signal 20*a* to the image pickup section 16 in order to execute level adjustment with outputs from particular positions in accordance with the design of the image pickup section 16. In addition, the system controller 20 controls the timing signal generator 24, driver 26 and storage 28 although control lines are not shown specifically in FIG. 1.

The system controller 20 receives the clock signal 22*b* from the signal generator of the signal processor 22 as well as information representative of the various parameters determined by the signal processor 22. The system controller 20 generates the control signals 20*a* through 20*c* in accordance with the parameters, thereby causing the various sections to operate in synchronism with the clock signal 22*b*.

The timing signal generator 24 generates from the clock signal 22*b* various timing signals including a horizontal and a vertical synchronous signal, field-shift gate pulses, a horizontal and a vertical transfer signal, and a read/write timing signal for the line memory 162. The timing signal generator 24 feeds the timing signals 240*a* to the driver 26 and the timing signals 240*b* for sampling to the preprocessor 18.

The driver 26 is adapted to deliver drive signals 26*a* and 26*b* to the lens system 12 and iris diaphragm mechanism 14. The drive signal 26*a* drives the AF mechanism of the lens system 12 for the focusing purpose. The drive signal 26*b* causes the ring portion of the iris diaphragm mechanism 14 to rotate in response to a control signal, not shown, such that a difference between a target lens opening set beforehand and a photometric value decreases to zero. Further, the driver 26 feeds a drive signal 26*c* to the image pickup section 16 while managing the exposure time. The drive signal 26*c* causes signal charges generated by photoelectric transduction to be read out to transfer paths, transferred in the vertical and horizontal directions, and subjected to, e.g. horizontal thinning mixture in accordance with the operation mode.

The storage 28 for storing the image data is implemented by a semiconductor memory although it may, of course, be implemented by an optical or a magneto-optical disk by way of example. The monitor 30 is implemented by an LCD (Liquid Crystal Display) panel of, e.g. back-light type or light-reflecting type and displays a picture represented by the image signals 22*c* fed from the signal processor 22.

Figure 7A:
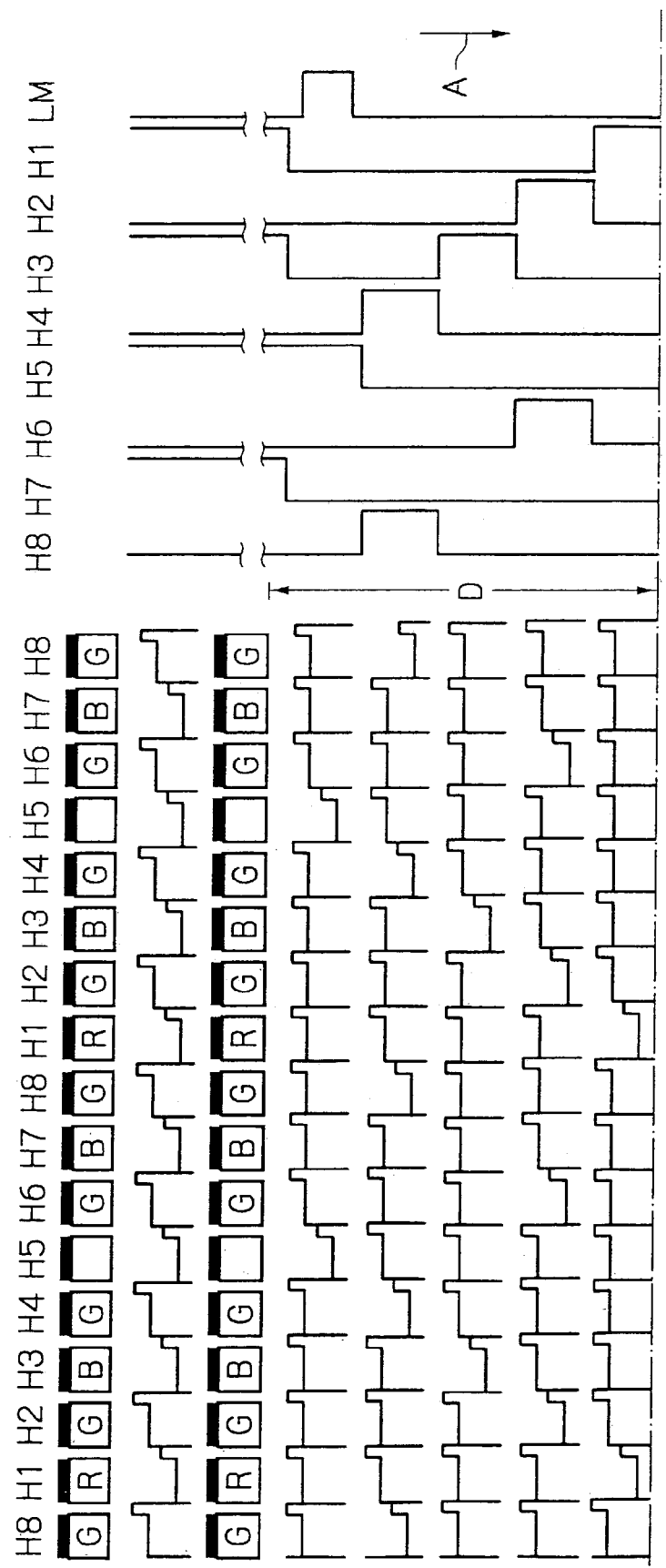
FIGS. 7A and 7B are combined.
Figure 7B:
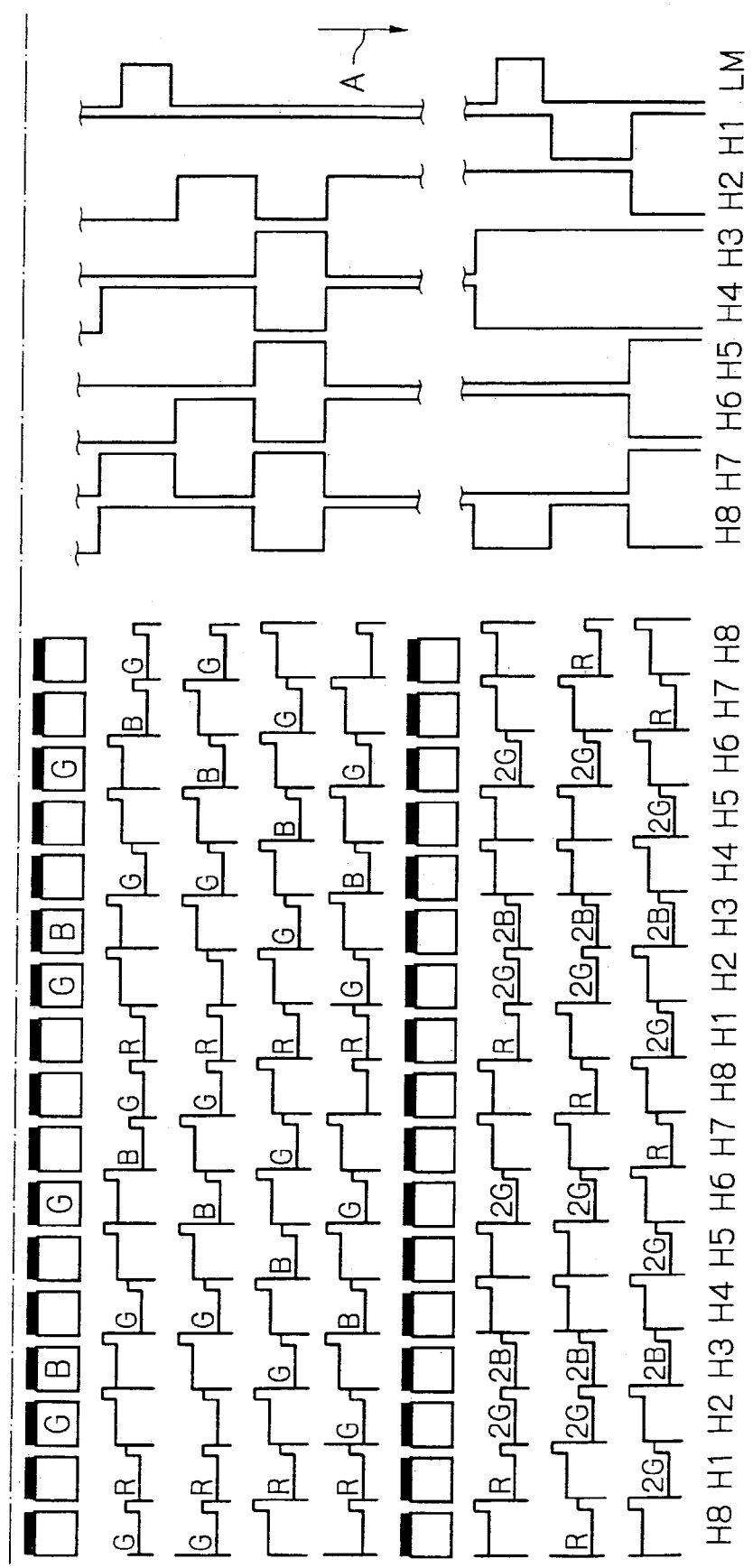

Horizontal thinning mixture to be executed in the image sensor 16*c* will be described hereinafter with reference to FIGS. 7A and 7B, which are combined as shown in FIG. 7.

FIGS. 7A and 7B show signal charges stored in the line memory (LM) 162, potentials formed in the horizontal transfer registers 164, and the timings of input drive signals. The time axis is indicated by arrows A in FIGS. 7A and 7B. More specifically, FIG. 7A shows a specific condition wherein signal charges read out from the photosensitive cells 160 on the second and third rows of FIG. 2, as counted from the zero-th row, and then vertically transferred are stored in the line memory 162. In the thinning horizontal mixture mode, transfer gate pulses are not applied to the gates connected to the electrode V3B, i.e. the image sensor 16*c* is operated via the electrodes V1 and V3A. Consequently, from such ones of the photosensitive cells 160 on the above two rows which receive a horizontal drive signal H5, signal charges are not read out representative of the color R. In the condition shown in FIG. 7A, no signal charges are present in the horizontal transfer registers 164.

The line memory 162 receives a read control signal at its positions corresponding to the horizontal drive signal H5 in order to horizontally mix the signal charges at the positions to which the drive signal H5 is applied and the signal charges at the positions where a horizontal drive signal H1 is applied. More specifically, only the horizontal drive signal H5 is caused to go high in order to form potential wells for accommodating the signal charges read out to the positions associated with the drive signal H5. As horizontal drive signals H1 through H8 indicate, drive signals of eight different phases are fed to the horizontal transfer registers 164.

However, it is known beforehand that horizontal mixture causes horizontally mixed signal charges appear at positions different from the original pattern of the color filter. For this reason, signal charges are absent at the positions corresponding to the drive signal H5. It follows that empty packets are wastefully transferred during the horizontal drive up to horizontal mixture. Omitting such wasteful horizontal drive is successful to reduce the reading time to a noticeable degree.

FIG. 7B shows a condition wherein the signal charges at the positions corresponding to the drive signals H1, H4, H7 and H8 of the line memory 162 shown in FIG. 7A are read out to the horizontal transfer registers 164, forming potential wells that are shown beneath the line memory 162. In this case, a high level is applied to the line memory 162 in order to open the gates for reading out the signal charges. The horizontal drive signals applied to the positions associated with the drive signals H1, H4, H7 and H8 are held at the high level thereof. At the time of the next transfer, the horizontal drive signals H8 and H4 remain in the high level thereof, but the horizontal drive signals H7 and H3 go low, so that the signal charges at the positions corresponding to the drive signal H8 (color G) remain at the same positions. This is also true with the signal charges at the positions corresponding to the drive signal H1 (color R) because the horizontal drive signal of high level is continuously applied.

Subsequently, the horizontal drive signals H2 through H8 other than the horizontal drive signal H1 are applied while alternating with each other as to the high/low level, so that the signal charges at the positions corresponding to the drive signals H4, H6 and H8 each shift the position of the associated potential well one by one. Consequently, when the positions associated with the drive signals H1 through H8 are regarded as a unit, potential wells are formed as denoted with H1 (R), H2 (G), H3 (/), H4 (B), H5 (/), H6 (G), H7 (/) and H8 (-). It is to be noted that the symbols "/" and "-" respectively indicate a condition wherein a potential well is not formed and a condition wherein a potential well is formed but a signal charge is absent.

Subsequently, the horizontal drive signals H4 and H3 are caused to go low and high, respectively, thereby forming potential wells as denoted with H1 (R), H2 (G), H3 (G), H4 (/) H5 (/), H6 (G), H7 (/) and H8 (/). In this condition, the signal charges of the colors R, G and B are read out from the positions associated with the drive signals H2, H3 and H6 of the line memory 162 and mixed with the existing signal charges, so that the signal charges at the positions associated with the drive signals H2, H3 and H6 are doubled, as indicated by 2G, 2B and 2G.

After the horizontal mixture described above, the signal charges (R) at the positions associated with the drive signal H1 each are shifted by one in the direction of read-out. Subsequently, the signal charges (R) shifted to the positions corresponding to the drive signal H8 and signal charges (2G) at the positions corresponding to the drive signal H2 each are shifted by one in the direction of read-out. Consequently, the signal charges are thinned and mixed in the horizontal direction, as shown on the bottom row of FIG. 7B. More specifically, on the bottom row, the signal charges (R) not subjected to horizontal mixture and doubled signal charges (2G) and (2B) subjected to the same appear.

By handling the color G and colors R and B represented by the signal charges as different rows, the image sensor 16c can read out, despite the thinning horizontal mixture, the signal charges in the same positional relation as the original pattern of the color filter. This will be described more specifically in relation to the following comparative example.

FIG. 8 shows a comparative solid-state image sensor 40 basically identical with the image sensor 16c of the illustrative embodiment except the points which will be described below. In FIG. 8, structural elements and signals like those of FIG. 2 are designated by identical reference numerals and will not be described specifically in order to avoid redundancy. As shown, signal lines extending from electrodes V1 and V3 each are connected line by line. This kind of connection has been customary with thinning read-out effected in the vertical direction and gives no consideration to horizontal thinning read-out based on horizontal mixture.

Figure 9:
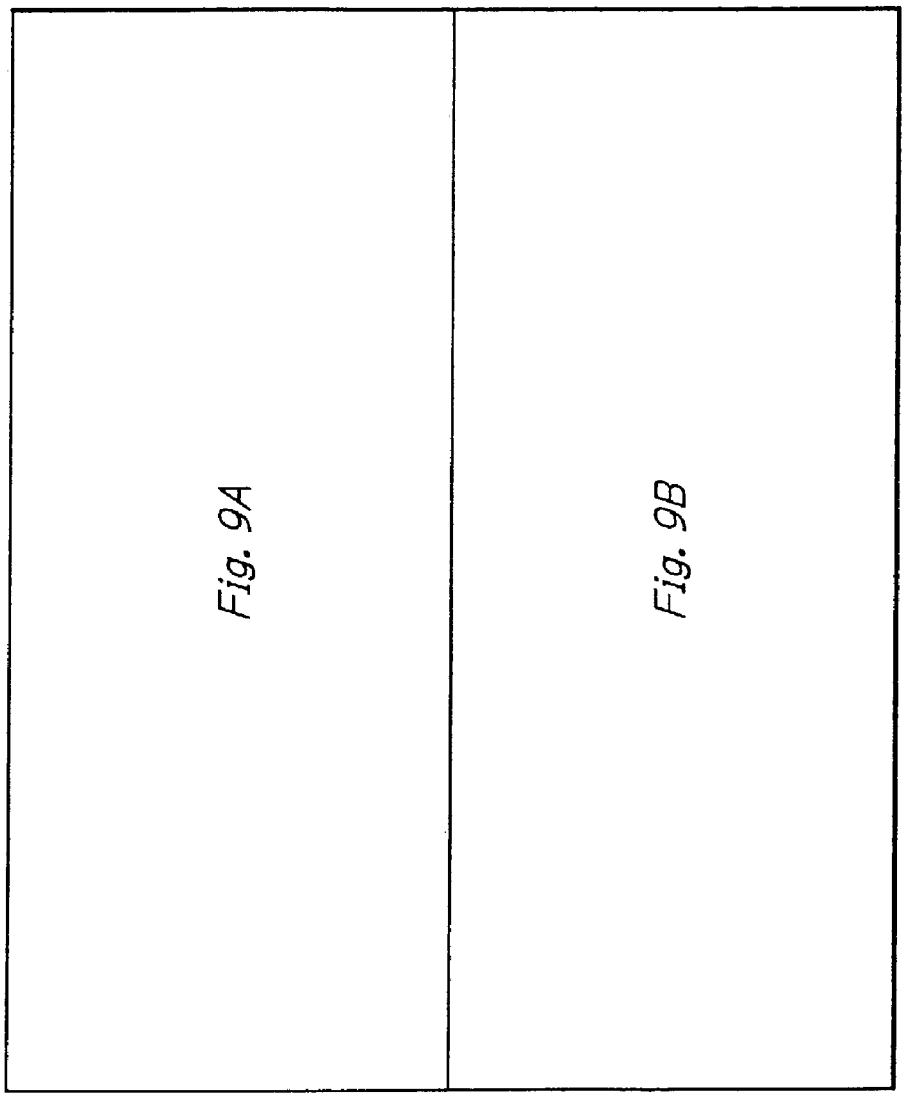
FIG. 9 shows how
Figure 9A:
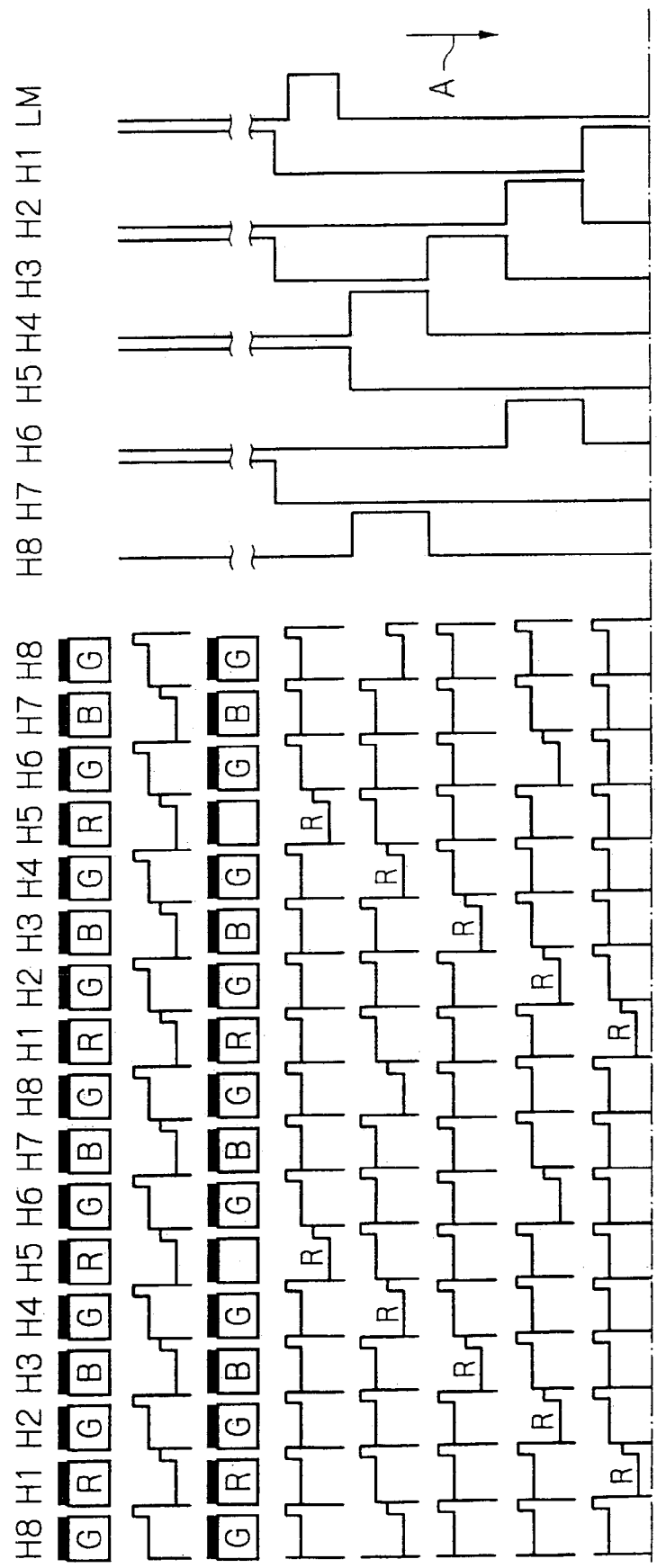
FIGS. 9A and 9B are combined.
Figure 9B:
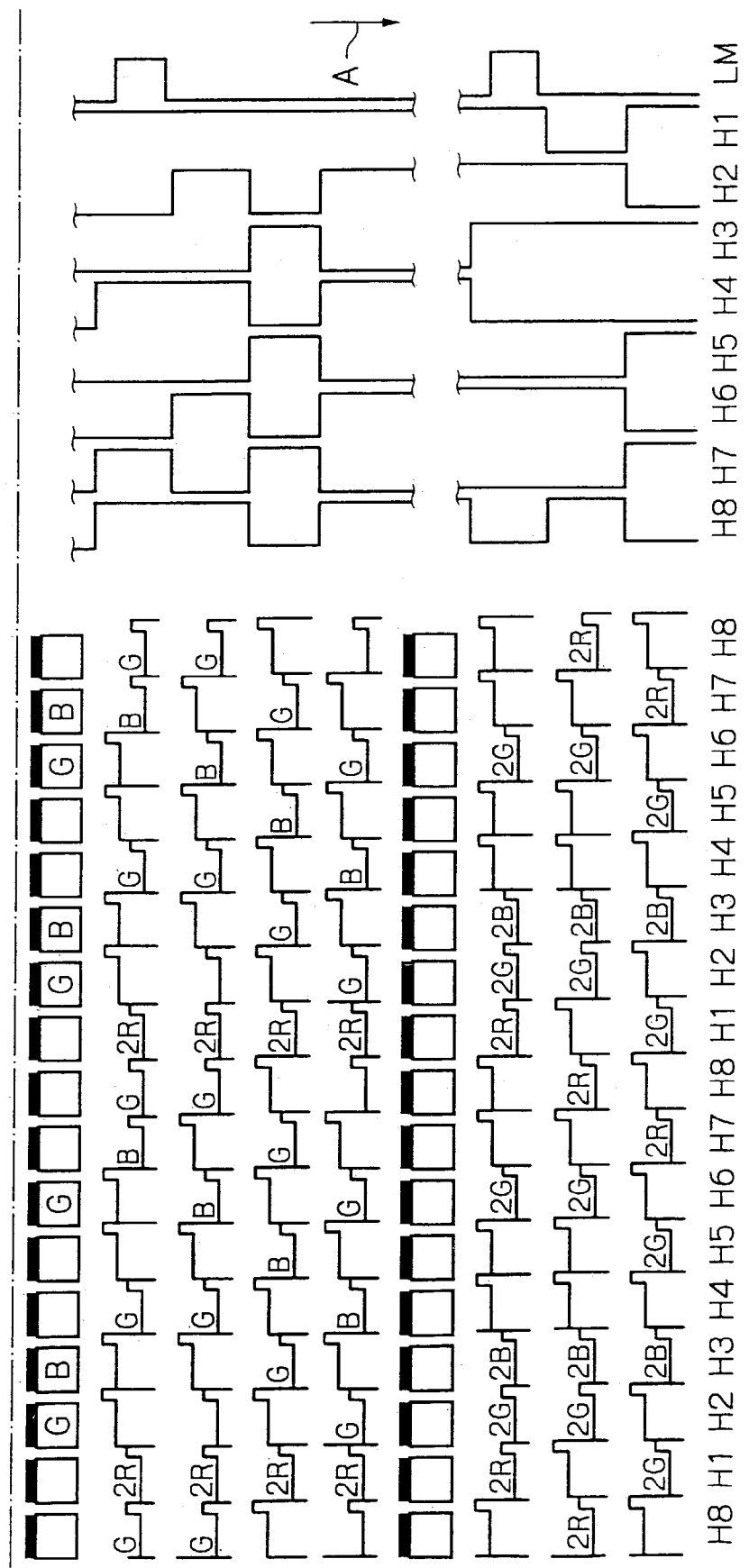

Horizontal thinning read-out based on horizontal mixture and available with the comparative image sensor 40 will be described with reference to FIGS. 9A and 9B, which are combined as shown in FIG. 9. FIGS. 9A and 9B show signal charges stored in the line memory (LM) 162, potentials formed in the horizontal transfer registers 164, and the timings of input drive signals. The time axis is indicated by arrows A in FIGS. 9A and 9B. More specifically, FIG. 9A shows a specific condition wherein signal charges read out from the photosensitive cells 160 on the second and third rows of FIG. 8, as counted from the zero-th row, and then vertically transferred are stored in the line memory 162. In FIG. 9A, the signal charges (color R) stored at the positions corresponding to the drive signal H5 of the line memory 162 are read out to the horizontal transfer registers 164 and then sequentially shifted to the positions corresponding to the drive signal H1.

Figure 10:
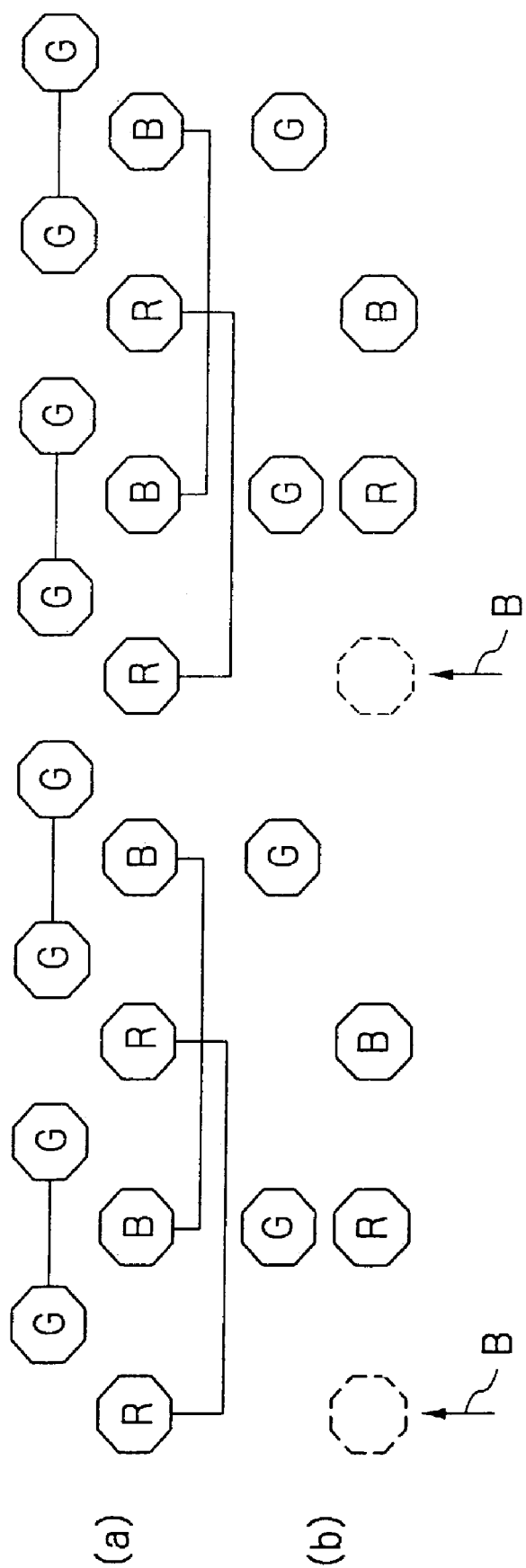
FIG. 10 shows, with the structure of a G square, RG full-checker pattern shown in FIG. 2, positional relations between pixels to be subjected to horizontal mixture and between the resulting pixels in upper and lower parts (a) and (b), respectively.

In the image sensor 40, photosensitive cells 160 photoelectrically transduce light imagewise incident thereto via the filter segments of the color filter 16b to signal charges each having a particular color attribute. The signal charges of the same color are mixed in order to avoid color mixture during horizontal mixture, as shown in FIG. 10, upper part (a). In FIG. 10, straight solid lines indicate pairs of signal charges to be mixed together. FIG. 10, lower part (b), shows the positions of signal charges produced by the horizontal mixture. As shown, each mixed signal charge derived from the signal charges of color R is positioned on the same column as the mixed signal charge derived from the signal charges of color G. Such a position of the mixed R signal charge is deviated from a desired position represented by a phantom pixel indicated by arrows B. Why attention is paid to the R signal charges is that signal charges subjected to horizontal mixture should be shifted to positions where the color R has the same positional relation as the R color filter segments of the original color filter 16b.

In FIG. 9B, the signal charges at the positions corresponding to the drive signals H1, H4 and H8 are read out from the line memory 162. The signal charge read out from each position H1 is horizontally mixed with the signal charge of color R just underlying it, producing a signal charge 2R. This is followed by the horizontal drive in the same manner as in the illustrative embodiment. Consequently, assuming that the positions corresponding to the drive signals H1 through H8 are regarded as a unit, potential wells as denoted with H1 (2R), H2 (G), H3 (/), H4 (B), H5 (/), H6 (G), H7 (/), and H8 (-) are formed.

Subsequently, horizontal drive is continued to read out the other signal charges left in the line memory 162. As a result, potential wells as denoted with H1 (2R), H2 (2G), H3 (2B), H4 (/), H5 (/), H6 (2G), H7 (/) and H8 (/) are formed. Thereafter, the signal charges are evenly distributed on a potential barrier basis, thereby forming potential wells as denoted with H1 (2G), H2 (/), H3 (2B), H4 (/), H5 (2G), H6 (/), H7 (2R) and H8 (/).

Simple horizontal mixture would bring about color shift, as described with reference to FIG. 10. To obviate the color shift, giving consideration to the color R, the comparative example shifts the signal charges beforehand to positions where color shift does not occur. The illustrative embodiment omits signal charges causative of color shift beforehand by using an electrode structure that inhibits the read-out of the above signal charges. This electrode structure, however, makes the shift of signal charges causative of color shift stated above wasteful. In light of this, the timing signal 240a applied to the driver 26 is configured to omit a scanning period D shown in FIG. 7A, which results in the wasteful transfer of signal charges. The driver 26 drives the image pickup section 16 with the drive signal 26c matching with the timing signal 240a. It follows that the image sensor 16c of the illustrative embodiment can reduce the horizontal scanning time by the scanning period D, compared to the comparative image pickup section 40.

Figure 12:
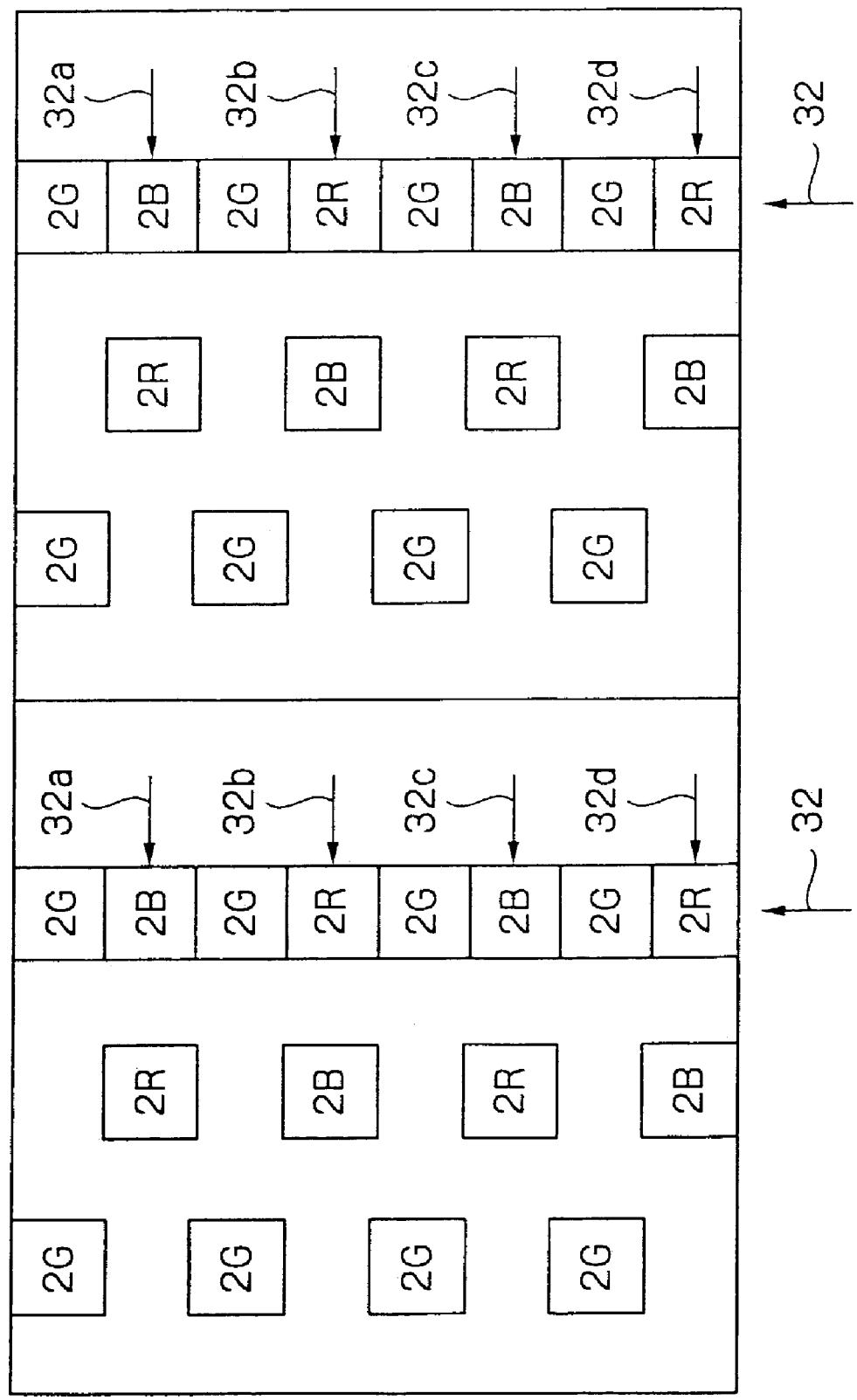
FIG. 12 schematically shows a color pattern reproduced when horizontal two-pixel mixture is effected with the blocks of FIG. 11 without consideration given to color shift.
Figure 13:
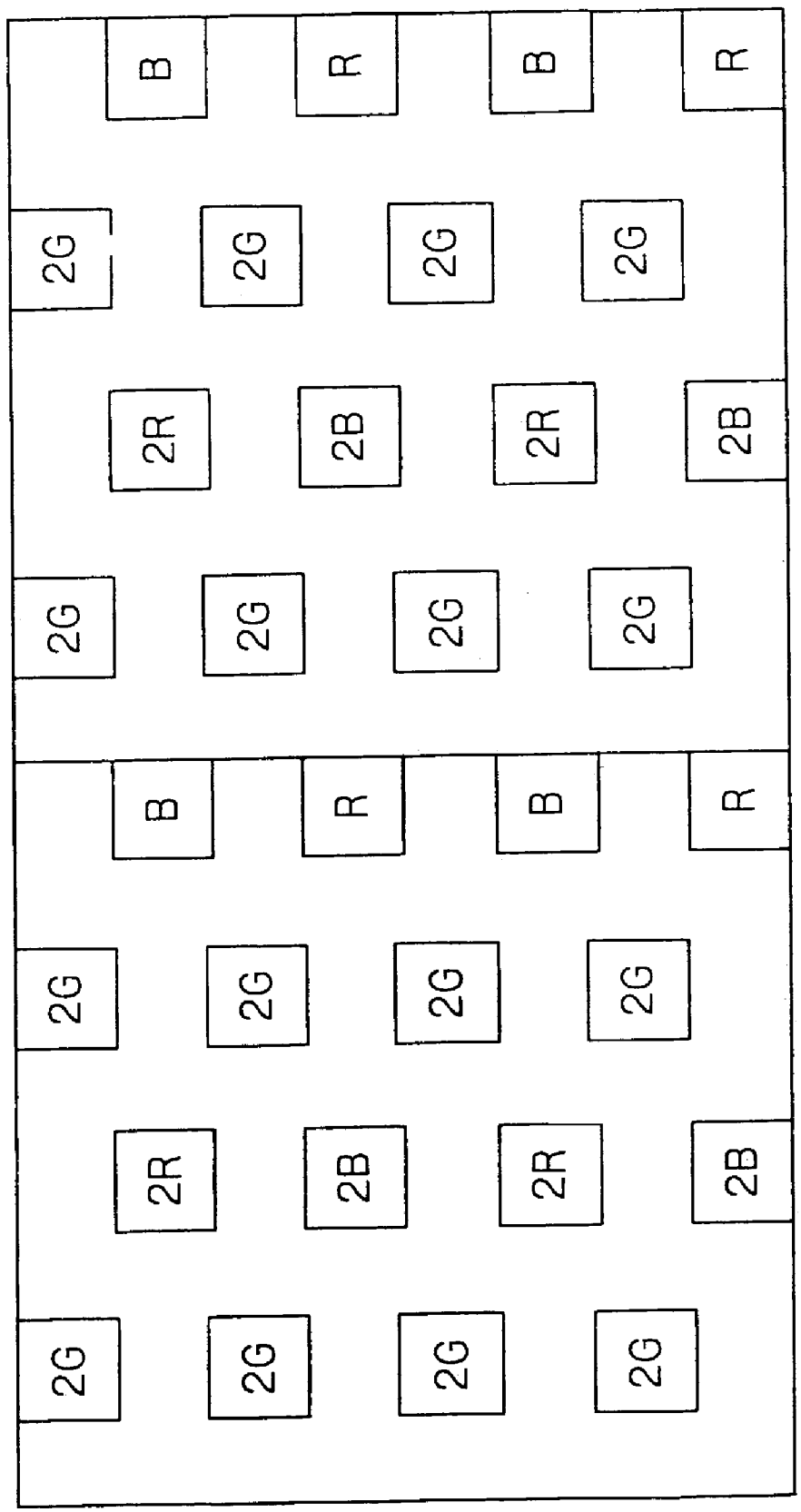
FIG. 13 shows, similarly to FIG. 12, a color pattern reproduced with consideration given to color shift.

FIG. 11 shows a G square, RB full-checker pattern in which an 8×8 matrix made up of thirty-two actual pixels and thirty-two virtual pixels is usually dealt with as a single block. Assume that the image sensor 16c simply performs horizontal two-pixel mixture without giving consideration to color shift. Then, as shown in FIG. 12, pixels positioned on a column indicated by arrows 32a through 32d would be arranged in a pattern different from the original pattern. By contrast, as shown in FIG. 13, the horizontal thinning, horizontal two-pixel mixture can generate a G square, RB full checker pattern identical with the original color pattern with consideration given to color shift. When the actual pixels are directly read out by the above procedure, signal charges at the right end of each block each are theoretically one-half of a pixel resulting from horizontal mixture.

Figure 15:
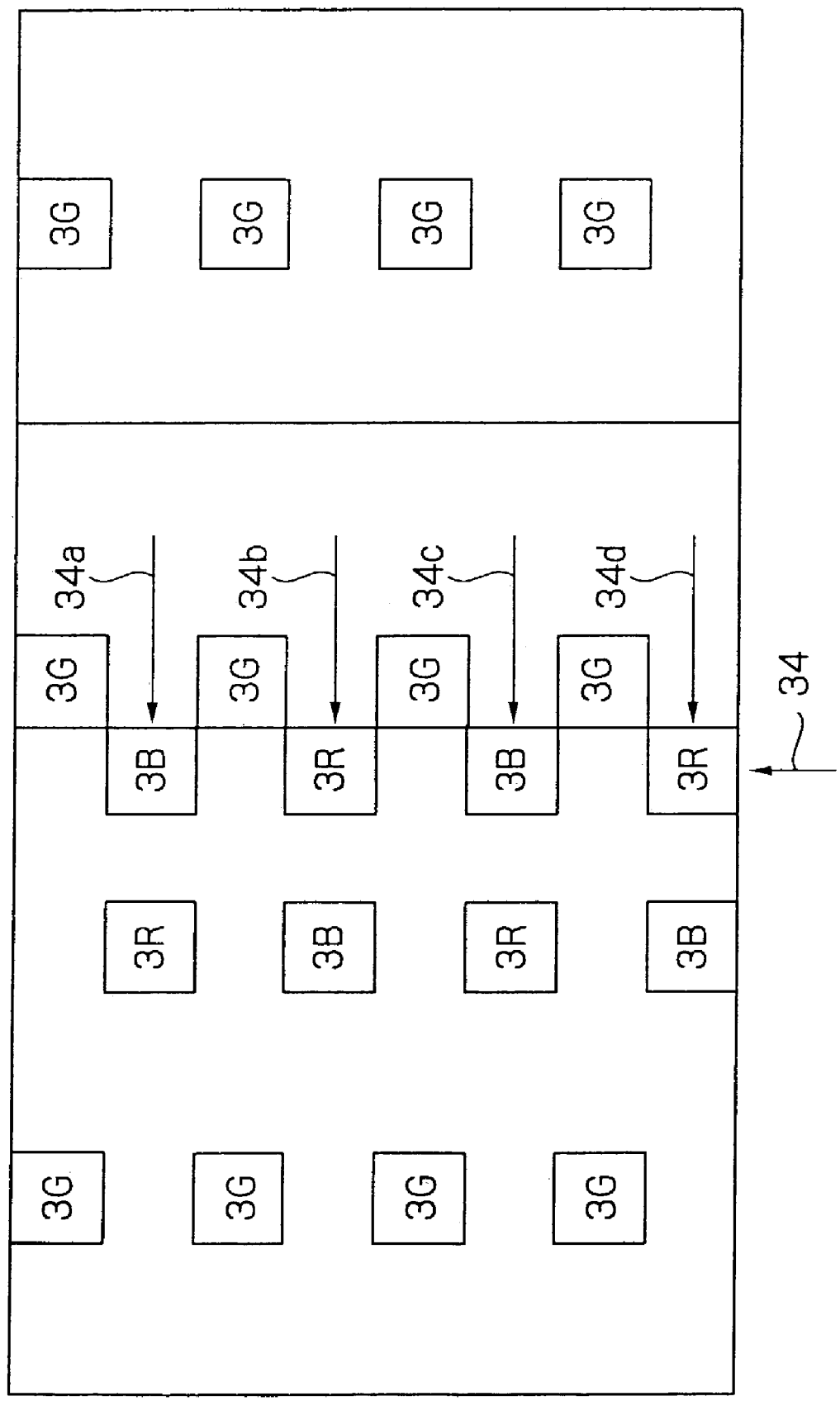
FIG. 15 schematically shows a color pattern reproduced when horizontal three-pixel mixture is effected with the blocks of FIG. 14 without consideration given to color shift.
Figure 16:
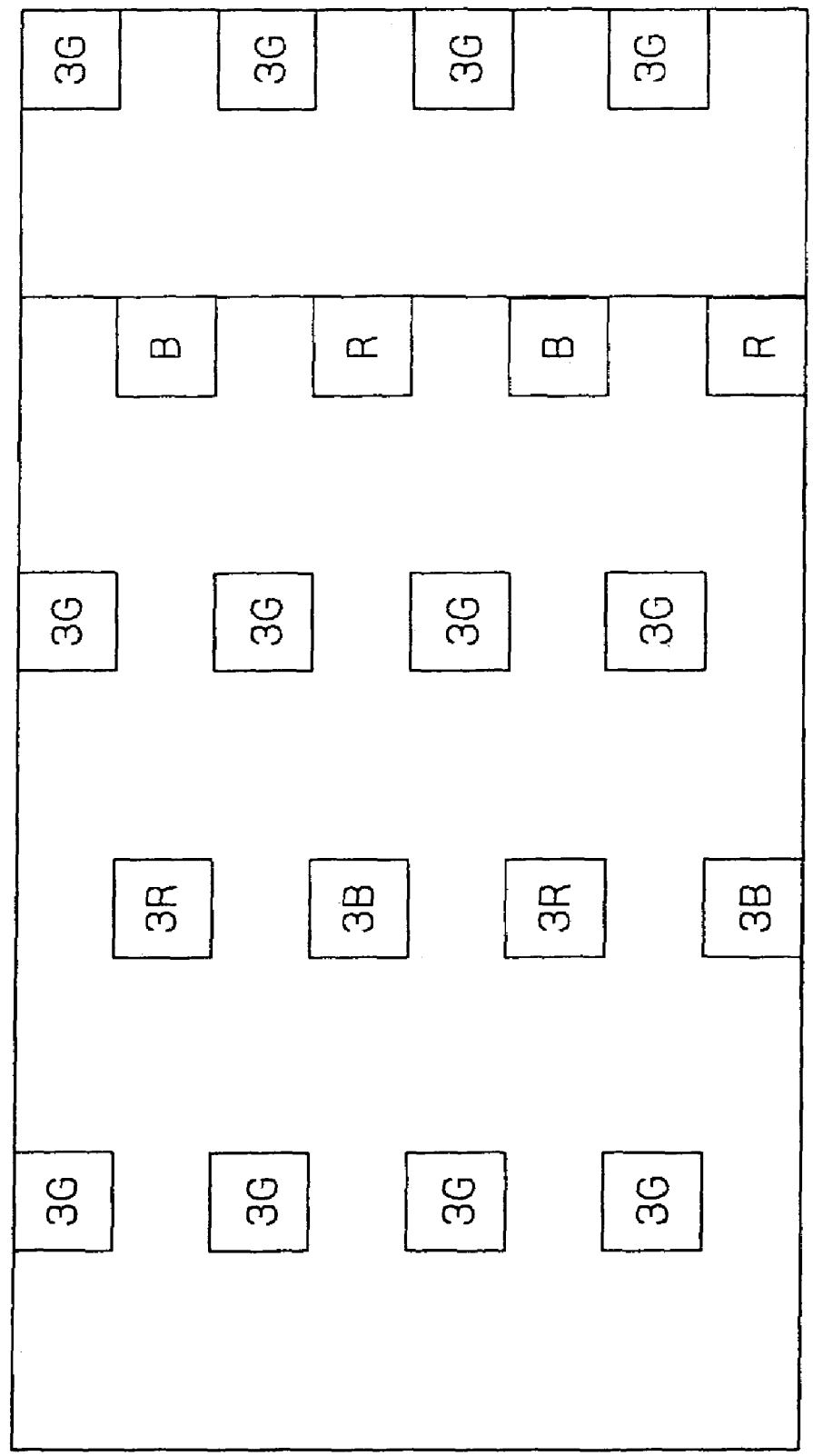
FIG. 16 shows, similarly to FIG. 12, a color pattern reproduced with consideration given to color shift.

FIG. 14 shows a G square, RB full-checker pattern in which a 12×8 matrix made up of forty-eight actual pixels and forty-eight virtual pixels is usually dealt with as a single block. Assume that the image sensor 16c simply performs horizontal three-pixel mixture without giving consideration to color shift. Then, as shown in FIG. 15, pixels positioned on a column indicated by arrows 34a through 34d would be arranged in a pattern different from the original pattern. By contrast, as shown in FIG. 16, the horizontal thinning, horizontal three-pixel mixture stated earlier can generate a G square, RB full-checker pattern identical with the original color pattern with consideration given to color shift. When the actual pixels are directly read out by the above procedure, signal charges at the right end of each block each are theoretically one-third of a pixel resulting from horizontal mixture. It will be seen that the gates of pixels to which the electrode V3B is to be connected differ from the horizontal thinning, two-pixel horizontal mixture to the horizontal thinning, three-pixel horizontal mixture. Therefore, the thinning horizontal mixture of the illustrative embodiment should preferably be designed in consideration of the number of pixels to be mixed in the horizontal direction.

As stated above, when the signal reading time is limited as with a movie and when the number of pixels is as large as several millions, a signal reading mode is a decisive factor. In this sense, thinning horizontal mixture contributes a great deal to the reduction of the reading time. While signal charges corresponding to signal charges located at positions causative of color shift, which are inhibited from being read out, are directly read out, they are smaller in amount than the other signal charges subjected to horizontal mixture. Such short signal charges are made up for by level adjustment effected by any one of the output amplifier 166 of the image sensor 16c, gain controlled amplifier 184, and signal processor 22.

The camera 10 configured to execute thinning horizontal mixture, as stated above, can read out signal charges at high speed without regard to the number of pixels. This, coupled with the fact that the color filter pattern of signals to be read out is identical with a still picture, enhances the quality of the resulting picture.

Figure 17:
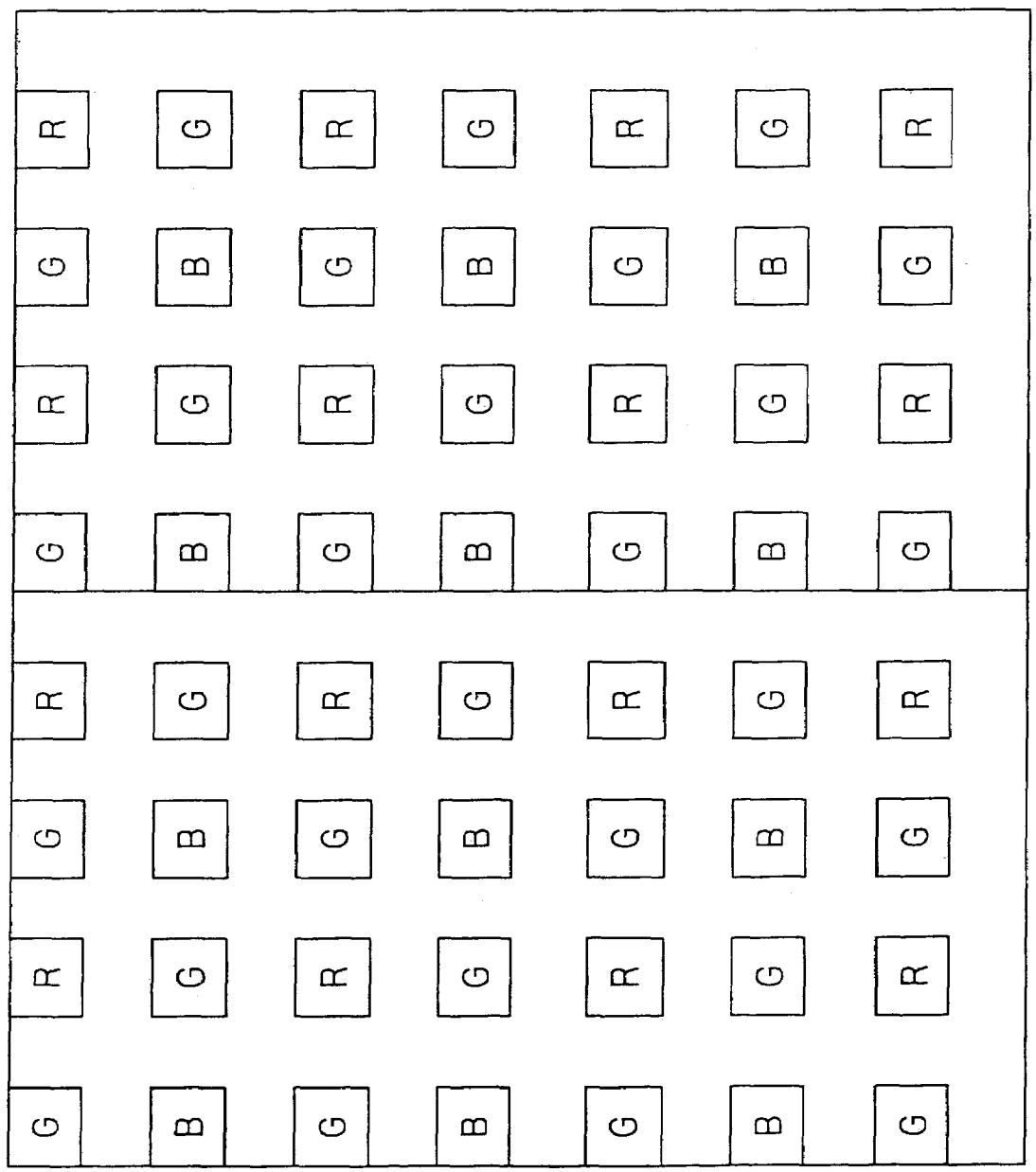
FIG. 17 schematically shows a Bayer pattern applied to the color filter of FIG. 2.
Figure 18:
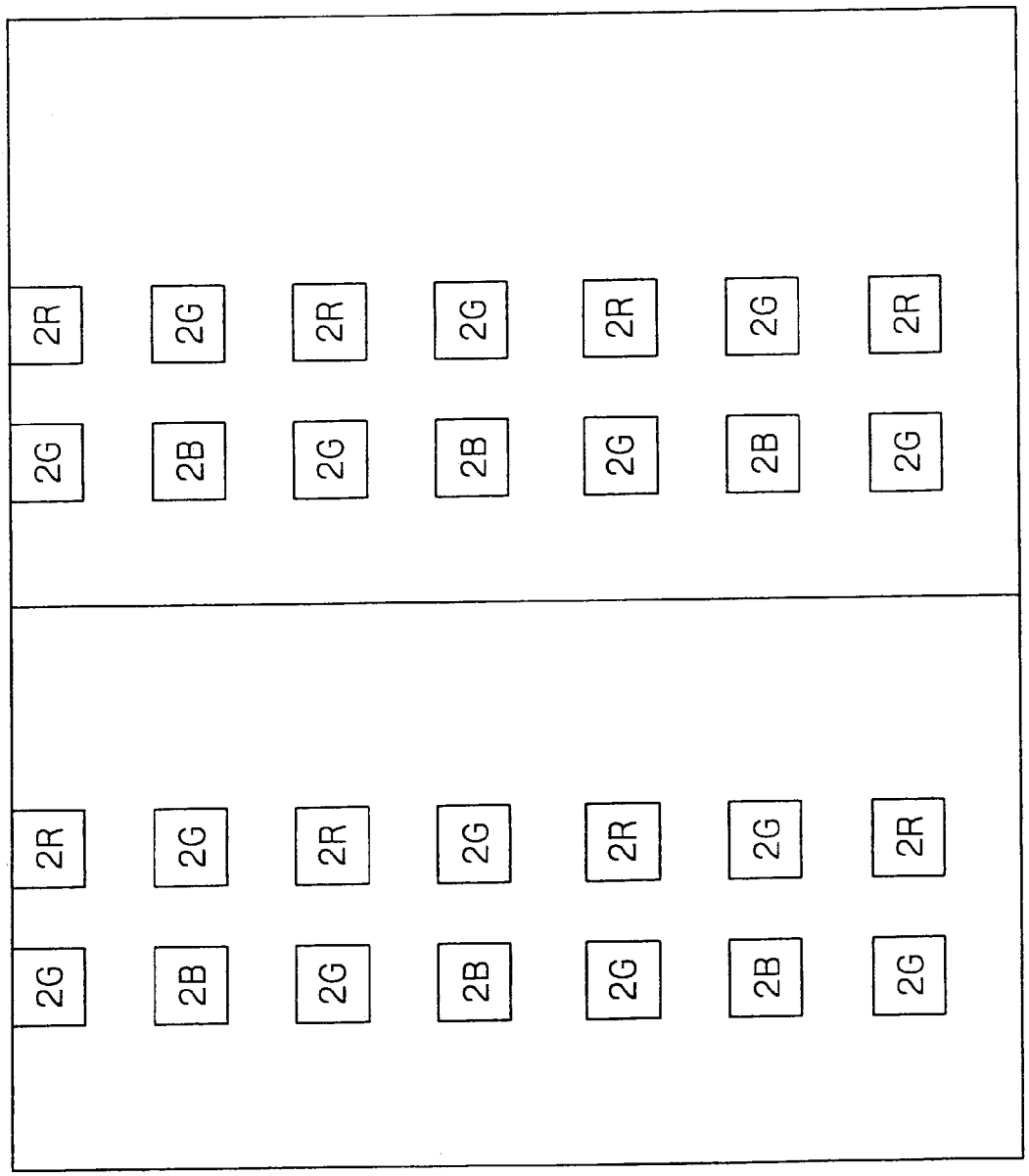
FIG. 18 schematically shows a color pattern reproduced when horizontal two-pixel mixture is effected with the positional relation of FIG. 17 without consideration given to color shift.
Figure 19:
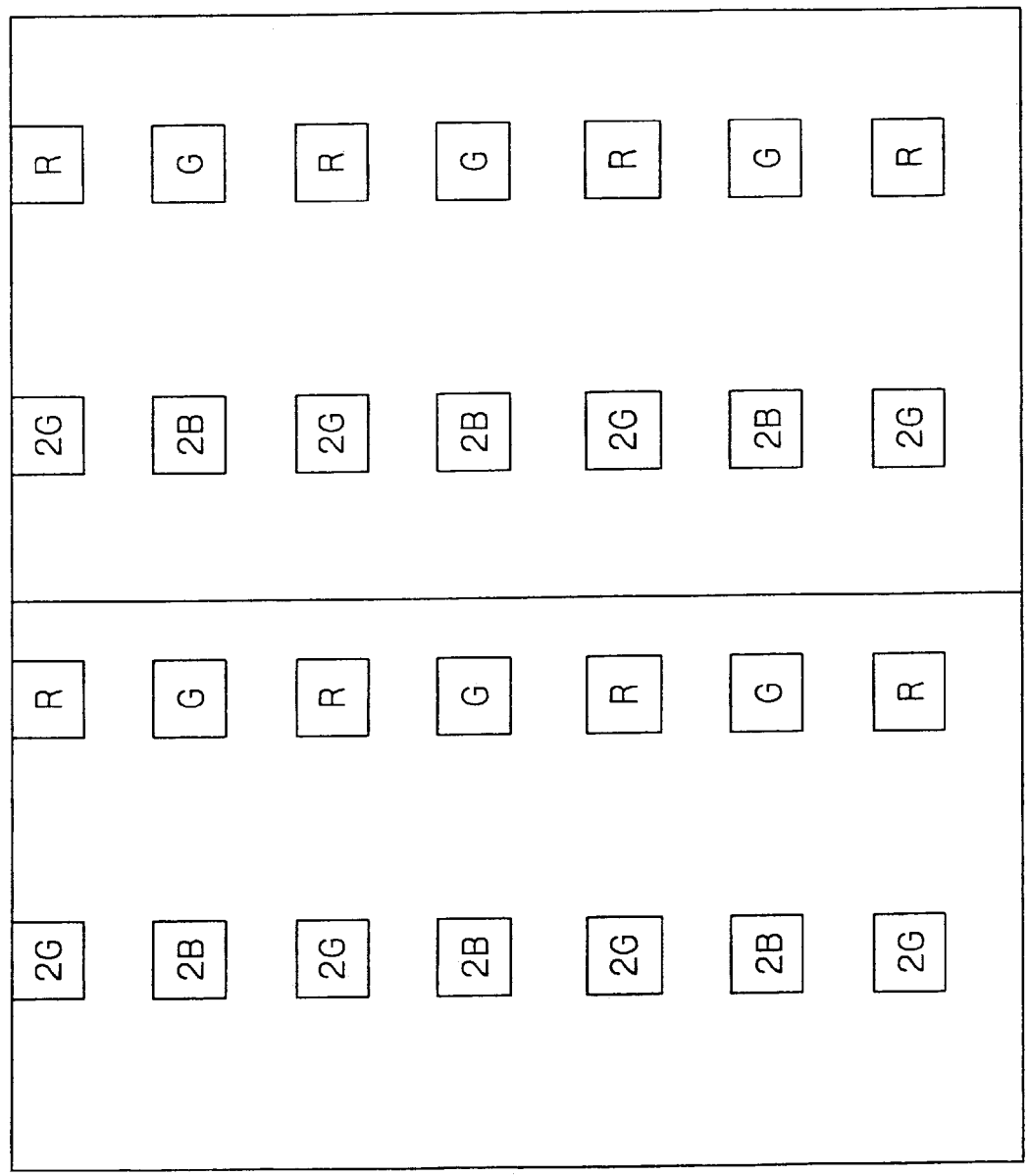
FIG. 19 schematically shows a first color pattern reproduced when horizontal thinning, horizontal two-pixel mixture is effected with the positional relation of FIG. 17 with consideration given to color shift.

While the illustrative embodiment has concentrated on the color filter 16b having a G square, RB full-checker pattern, the present invention is capable of executing the horizontal thinning, two-pixel horizontal mixture even with a Bayer pattern or a G tripe, RB full-checker pattern. FIG. 17 shows a Bayer pattern in which, assuming a square arrangement of four pixels, G filter segments are positioned at two diagonally opposite corners while an R and a B filter segment are positioned at the other two diagonally opposite corners. As shown in FIG. 18, when two-pixel horizontal mixture is executed without giving consideration to color shift, the Bayer pattern can be produced, but the arrangement of the pixels is unbalanced. FIG. 19 shows the Bayer pattern reproduced by the horizontal thinning, two-pixel horizontal mixture. As shown, the horizontal thinning, two-pixel horizontal mixture omits the second column of each block, so that the resulting color pattern, inclusive of the second block, is well balanced in the horizontal direction. It is to be noted that the pixels on the rightmost column of each block are not subjected to horizontal mixture. The color pattern shown in FIG. 19 is feasible for a picture with low color temperature, i.e. a reddish picture.

Figure 20:
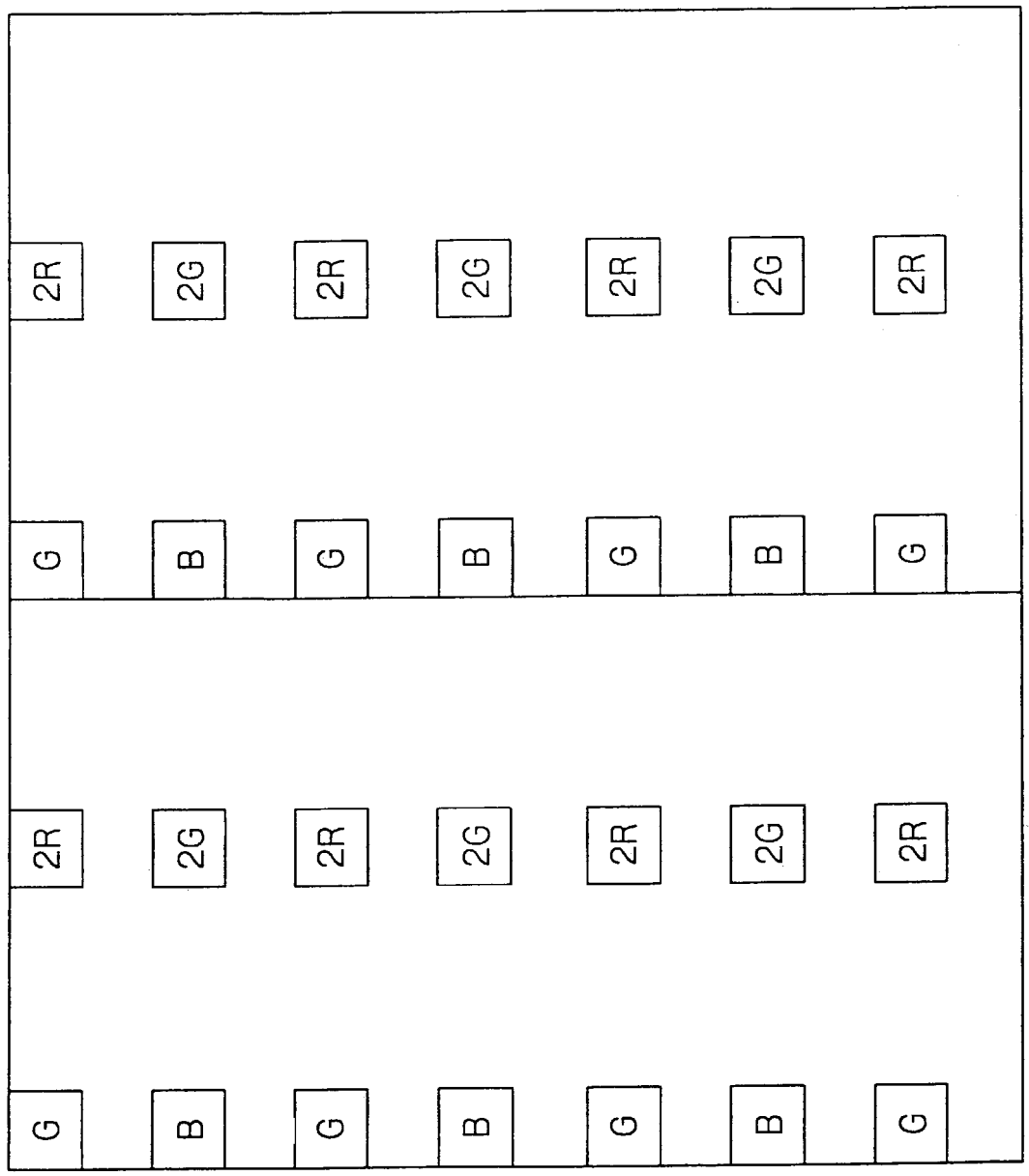
FIG. 20 schematically shows a second pattern reproduced when horizontal thinning, horizontal two-pixel mixture is effected with the positional relation of FIG. 17 with consideration given to color shift.

FIG. 20 shows another well-balanced pattern achievable when the horizontal thinning, two-pixel horizontal mixture is executed by connecting the third column of each block connected to the electrode V3B and directly reading out the first column. The color pattern of FIG. 20 is feasible for an image with high color temperature, i.e. a bluish image. With this scheme, it is possible to enhance the S/N (Signal-to-Noise) ratio of the entire picture.

Figure 21:
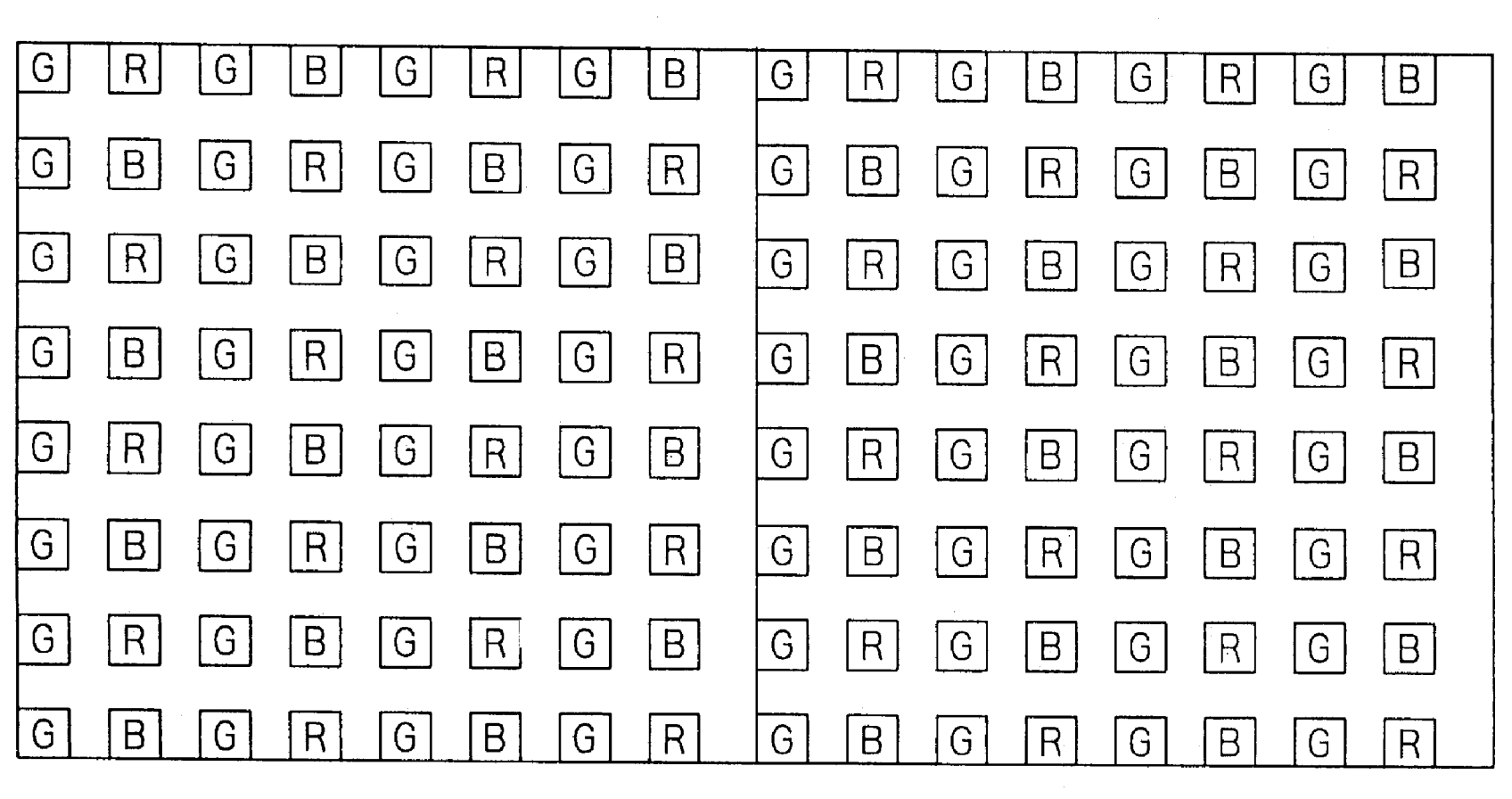
Figure 22:
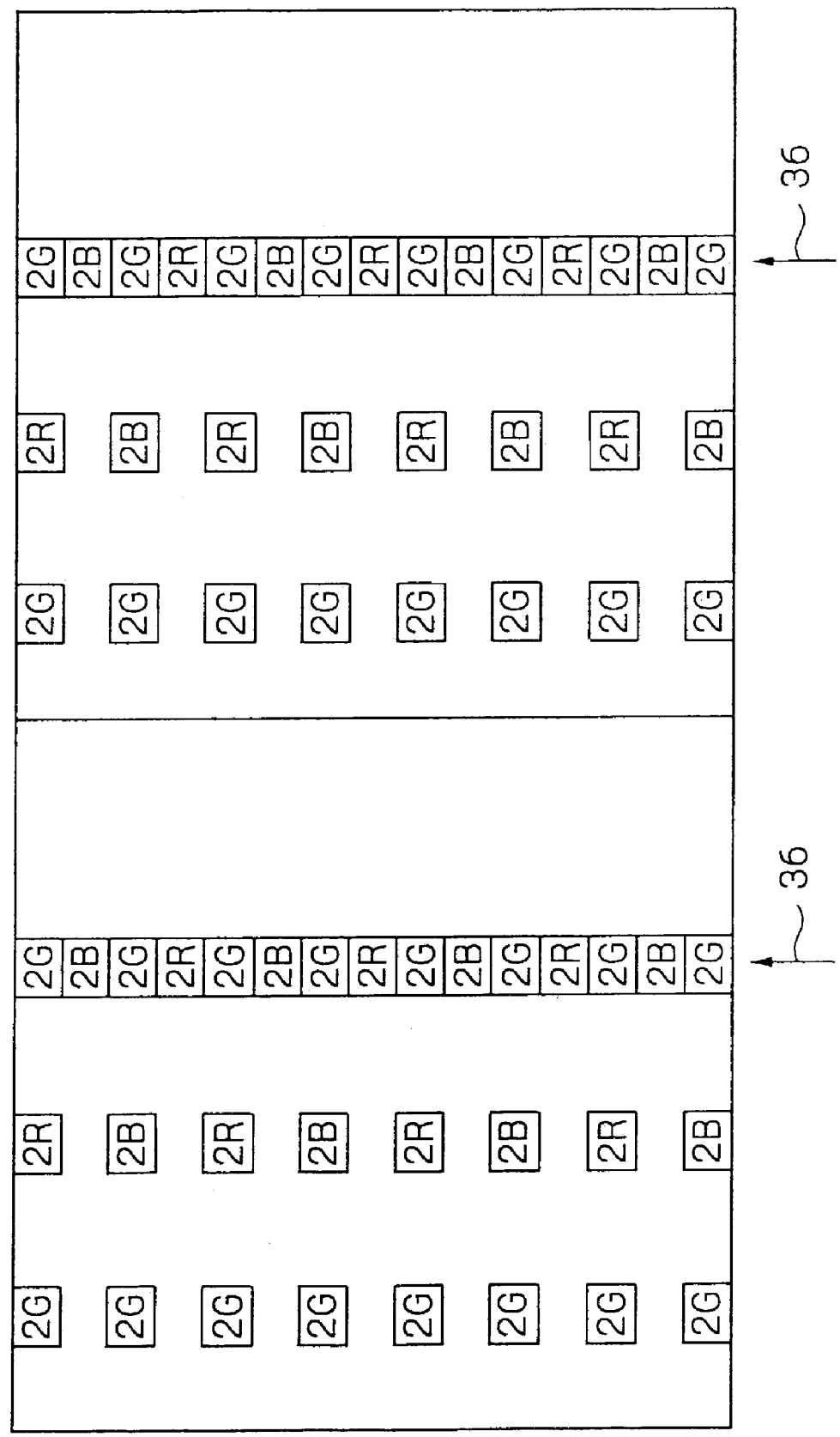
FIG. 22 schematically shows a color pattern reproduced when horizontal two-pixel mixture is effected with the positional relation of FIG. 21 without consideration given to color shift.

FIG. 21 shows a G stripe, RB full-checker pattern in which the G filter segments are arranged in vertical stripes or columns while the R and B filter segments are arranged in two columns at both sides of each G stripe in an opposite alternating relation, i.e. in a full checker pattern. FIG. 22 shows a color pattern produced when the pattern of FIG. 21 is subjected to two-pixel horizontal mixture giving no consideration to color shift. As shown, unnecessary pixels 2B and 2R appear on the column of each block indicated by arrows 36.

Figure 23:
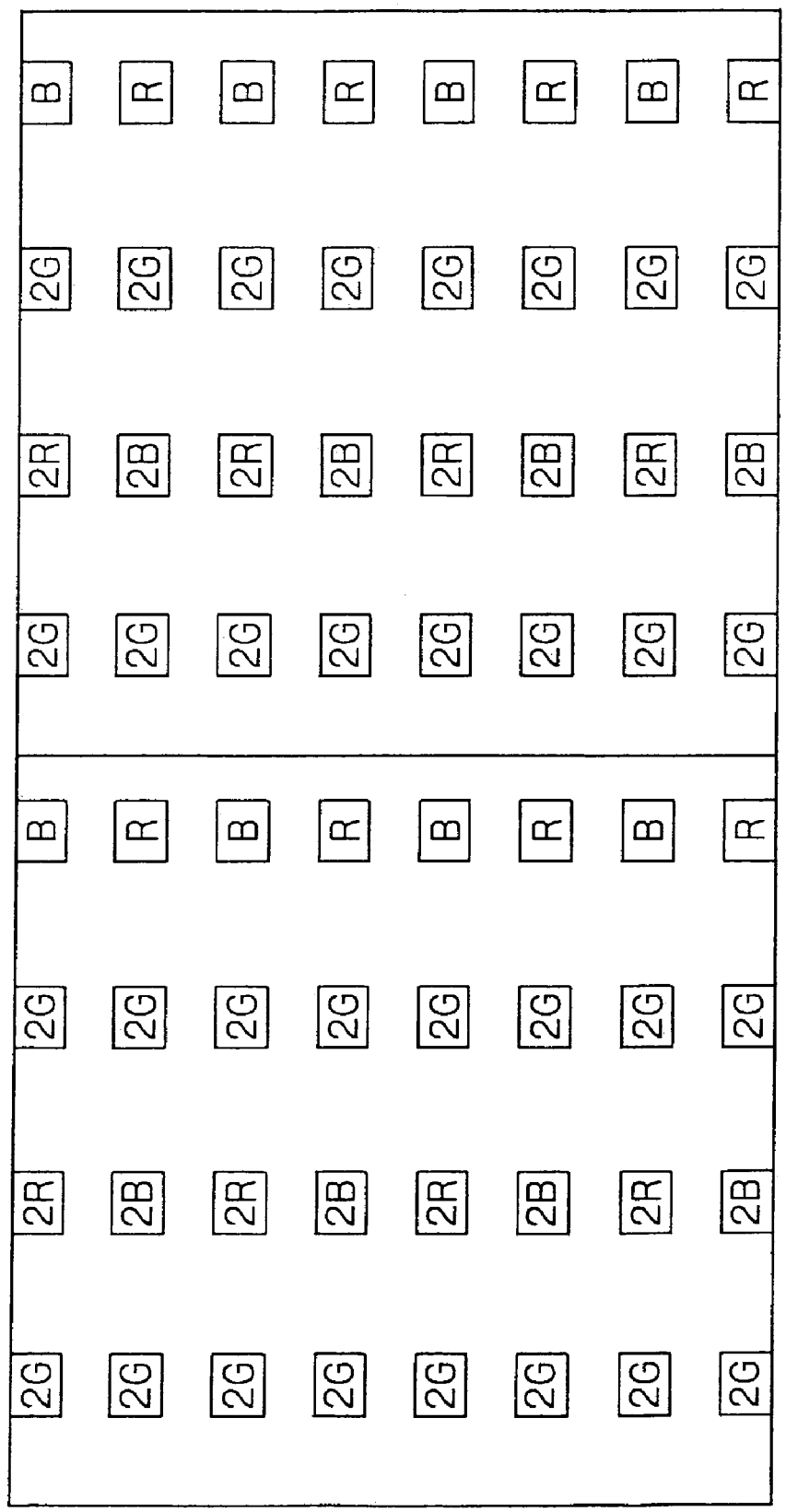
FIG. 23 schematically shows a color pattern reproduced when horizontal thinning, horizontal two-pixel mixture is effected with the positional relation of FIG. 21 with consideration given to color shift.

FIG. 23 shows a well-balanced color pattern derived from the G stripe, RB full-checker pattern of FIG. 21. The color pattern of FIG. 23 is achievable with the thinning horizontal mixture effected by leaving the rightmost column of each block pattern shown in FIG. 21 as it is and connecting the fourth column from the left to the electrode V3B.

Figure 24:
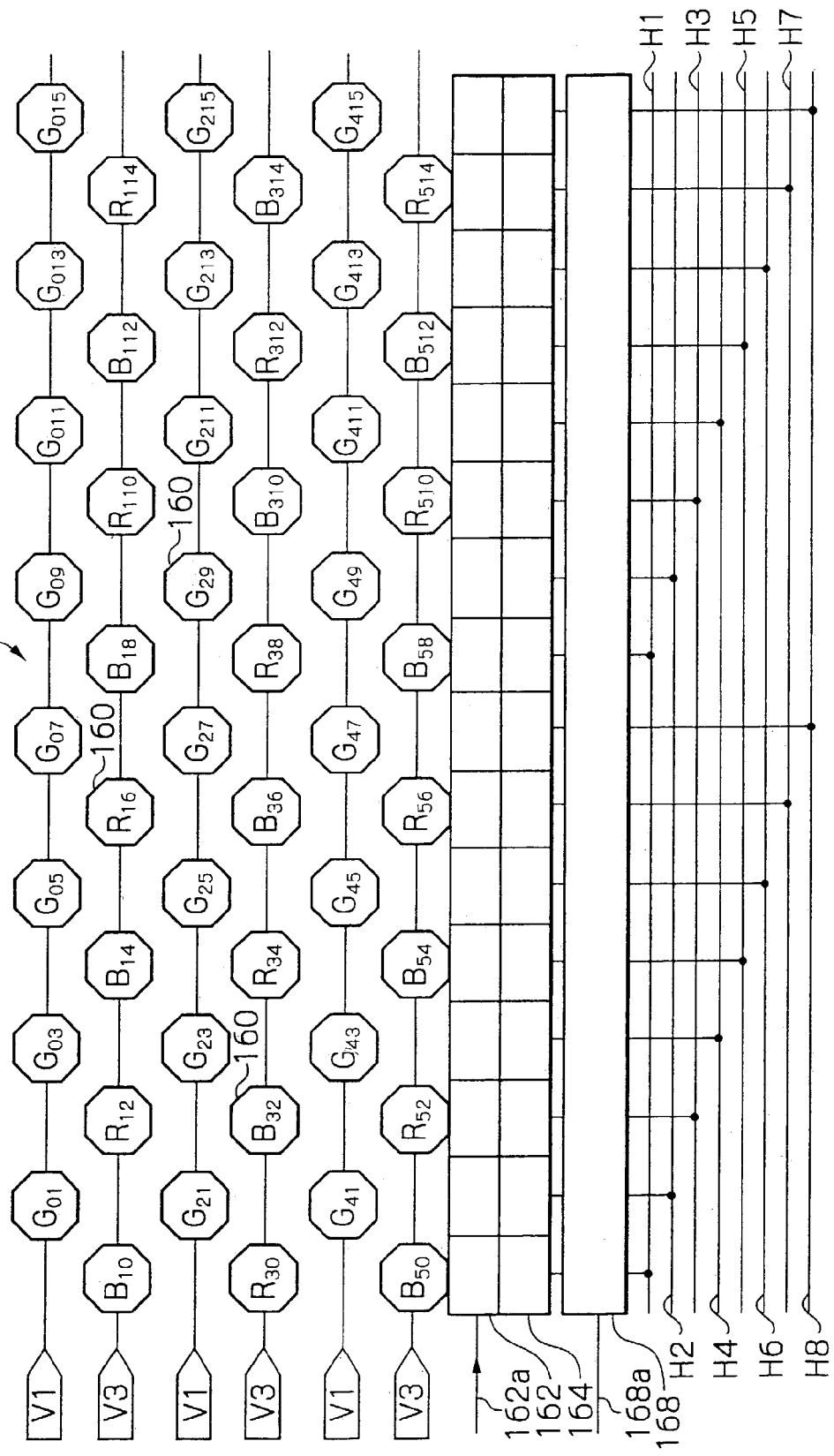
FIG. 24 schematically shows part of photosensitive cells representative of an alternative embodiment of the present invention.

Reference will be made to FIG. 24 for describing an alternative embodiment of the present invention also implemented as the digital camera 10. This embodiment is identical with the previous embodiment except for the configuration of the image sensor 16c. In the illustrative embodiment, the image sensor 16c has the same electrode structure as the comparative example in which the gates for reading signal charges of the same row are connected to the electrode V3, although not shown specifically.

As shown in FIG. 24, the image sensor 16c additionally includes horizontal drains 168 arranged in an array parallel to the horizontal transfer registers 164. The horizontal drains 168 sweep out signal charges, which are fed to the horizontal transfer registers 164, in accordance with a horizontal sweep signal 168a applied thereto, thereby omitting signal charges causative of color shift. The horizontal drains 168 may be interposed between the line memory 162 and the horizontal transfer registers 164, if desired.

Figure 25:
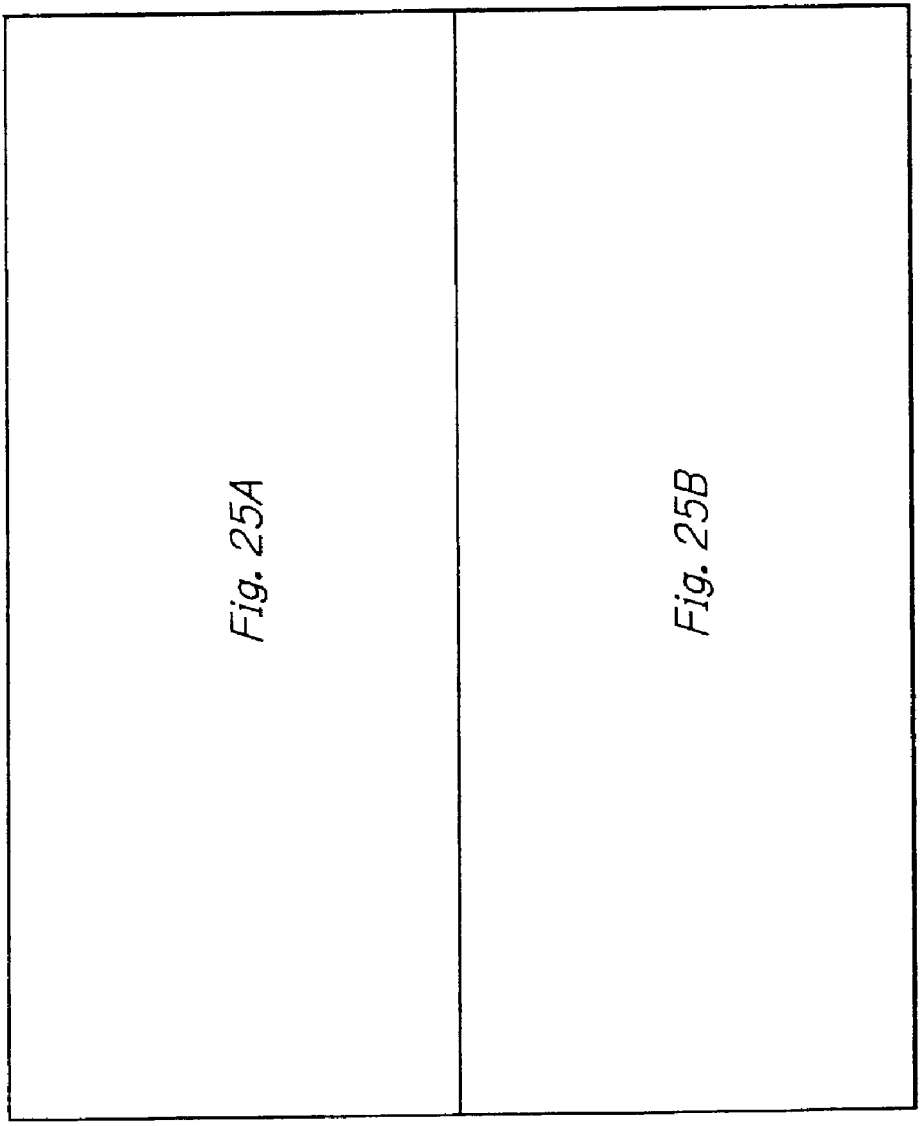
FIG. 25 shows how
Figure 25A:
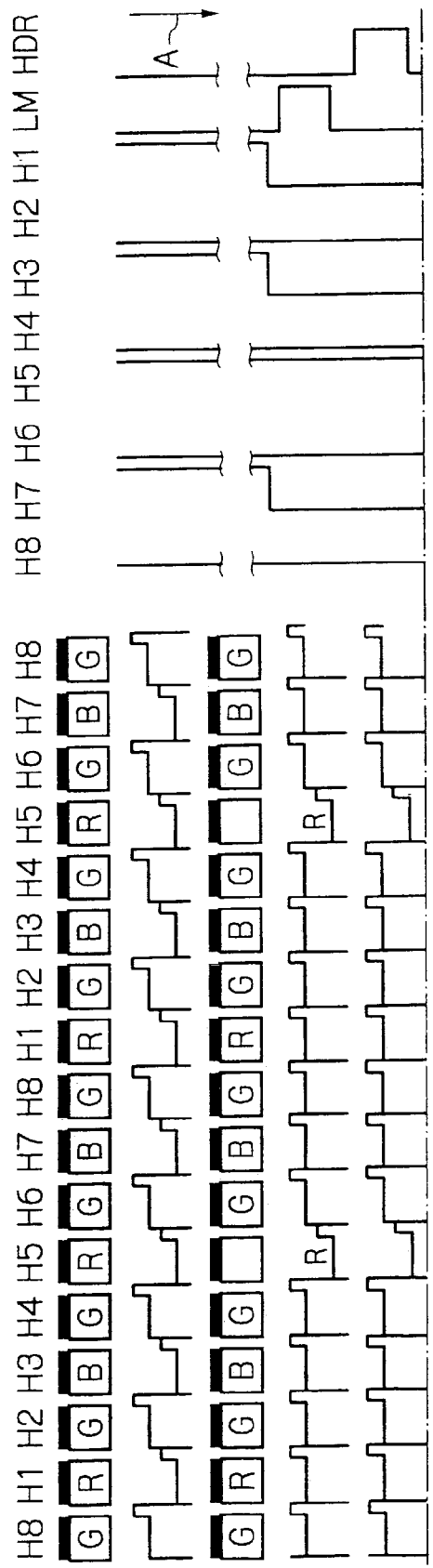
FIGS. 25A and 25B are combined.

A specific operation of the illustrative embodiment will be described with reference to FIGS. 25A and 25B, which are combined as shown in FIG. 25. FIG. 25A shows a condition wherein signal charges are read out from the second and third rows with consideration given to the zero-th row and stored in the line memory 162. In FIG. 25A, the time axis is indicated by an arrow A. As for the G square, RB full-checker pattern, color shift is ascribable to signal charges at the positions corresponding to the drive signal H5 (color attribute R), as will be understood from the previous embodiment also. Therefore, the drive signal applied to the line memory 162 is caused to go high in order to read signal charges at the positions corresponding to the drive signal H5 to the horizontal transfer registers 164. Subsequently, a drive signal (HDR) 168a is fed to the horizontal drains 168, which are parallel to the positions corresponding to the drive signal H5 of the horizontal transfer registers 164, thereby sweeping out the signal charges at the positions corresponding to the drive signal H5 to the horizontal drains 168. As a result, the signal charges are thinned in the horizontal direction. Such horizontal thinning makes it unnecessary to shift the signals causative of color shift as far as the positions where color shift does not occur.

Figure 25B:
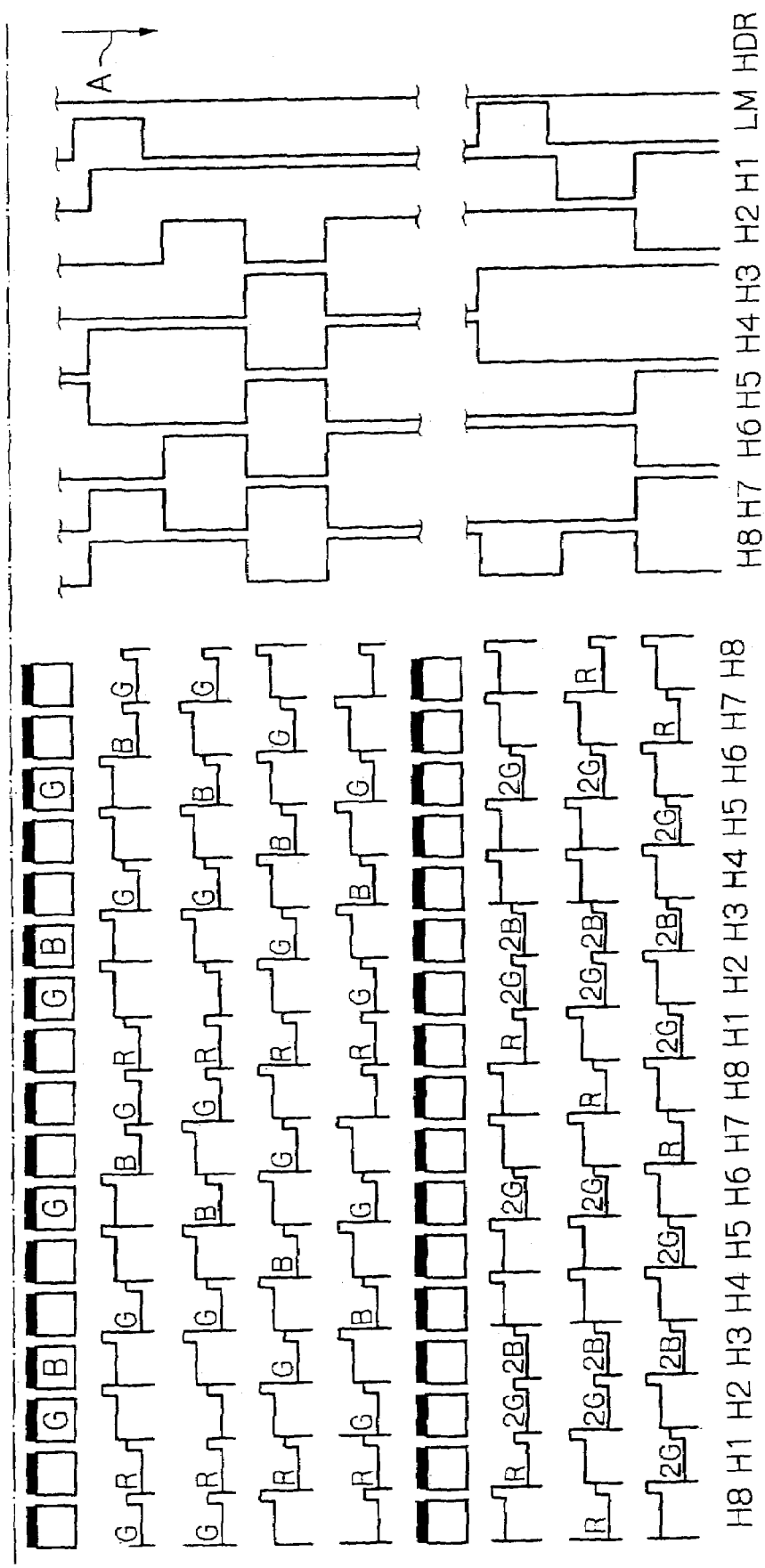

Subsequently, as shown in FIG. 25B, the pixels horizontally thinned by the above procedure and the pixels to be horizontally mixed therewith, i.e. the pixels at the positions corresponding to the drive signal H1 are read out to the horizontal transfer registers 164 and caused to stay there. For this purpose, the horizontal drive signal H1 applied to the positions corresponding to the drive signal H1 is held in a high level. To mix the colors B and G in the horizontal direction, a high-level signal 162a is fed to the positions corresponding to the drive signals H4, H7 and H8 of the line memory 162, thereby reading out the signal charges at the positions corresponding to the drive signals H4, H7 and H8 to the horizontal transfer registers 164. At this instant, the horizontal drive signals H4, H7 and H8 applied to the horizontal transfer registers 164 are caused to go high, so that potential wells are formed at the positions corresponding to the drive signals H4, H7 and H8 of the registers 164.

After the step stated above, only the B signal charges at the positions corresponding to the drive signal H7 are shifted by one in the reading direction without the R signal charges at the positions corresponding to the drive signals H4 and H8 being shifted. As a result, potential barriers are formed in front of the positions where the potential wells are present. Subsequently, the signal charges at the positions corresponding to the drive signals H4, H6 and H8 each are shifted by two in the reading direction, and then only the B signal charges at the positions corresponding to the drive signal H4 are shifted by one in the reading direction, although not shown specifically. Consequently, the G, B and G signal charges read out are positioned beneath the signal charges remaining in the line memory 162. At this instant, the drive signal 162a (LM) is fed to the line memory 162 for reading out the signal charges while the horizontal drive signals H1, H2, H4 and H6 applied to the horizontal transfer registers 164 are caused to go high.

Subsequently, the horizontal drive signal H1 is caused to go low while the horizontal drive signals H2, H3, H6 and H8 are caused to go high, so that the R signal charges are shifted in the reading direction. Thereafter, the horizontal drive signals H2, H6 and H8 are caused to go low while the horizontal drive signals H1, H5 and H7 are caused to go high. Consequently, in the horizontal transfer registers 164, the signal charges at the positions where the horizontal drive signals changed in level, as mentioned above, are shifted by one each.

In the previous embodiment, the electrode structure of the image sensor 16c is fixed at the design stage. By contrast, in the illustrative embodiment, particular ones of the horizontal drive signals assigned to the signal charges to be omitted are manipulated to sweep them out, so that the image sensor 16c can be driven by any desired manner. More specifically, the drive procedure of the image sensor 16c can be altered by software and therefore allows the signal charges to be read out in a suitable manner matching with the kind of a color filter used or the configuration of a unit block.

With the Bayer pattern, for example, it is possible to read out signal charges in either one of two different modes in accordance with the color temperature of a picture, as stated earlier. The previous embodiment can execute only one of the two different modes because it relies on fixed hardware in reading out signal charges. In the illustrative embodiment, a procedure representative of the two modes may be stored in the timing signal generator 24 beforehand and selectively executed in accordance with the reddish/bluish scene selected by the user. In such a case, the trigger signal 202 representative of the user's selection will be fed to the system controller 20 so as to cause it to control the timing signal generator 24. The camera 10 can therefore pick up a scene in the desired mode.

As stated above, the illustrative embodiment not only enhances the quality of still pictures and movies by performing thinning horizontal mixture in a short period of time, but also flexibly copes with a change in the kind of a color filter or the configuration of a unit block with software.

An image processing method unique to the illustrative embodiment will be described hereinafter in relation to the digital camera 10. The camera 10 to which the image processing method is applied also has the previously stated construction except for the image sensor and signal processor. The image processing method is executed with the image sensor 40 shown in FIG. 8 and performing horizontal mixture giving no consideration to color shift. For the image processing method, the signal processor 22 includes a color shift correcting circuit configured to correct color shift by using the image data 18c subjected to horizontal mixture for thereby accurately generating signal charges at expected positions.

Figure 26:
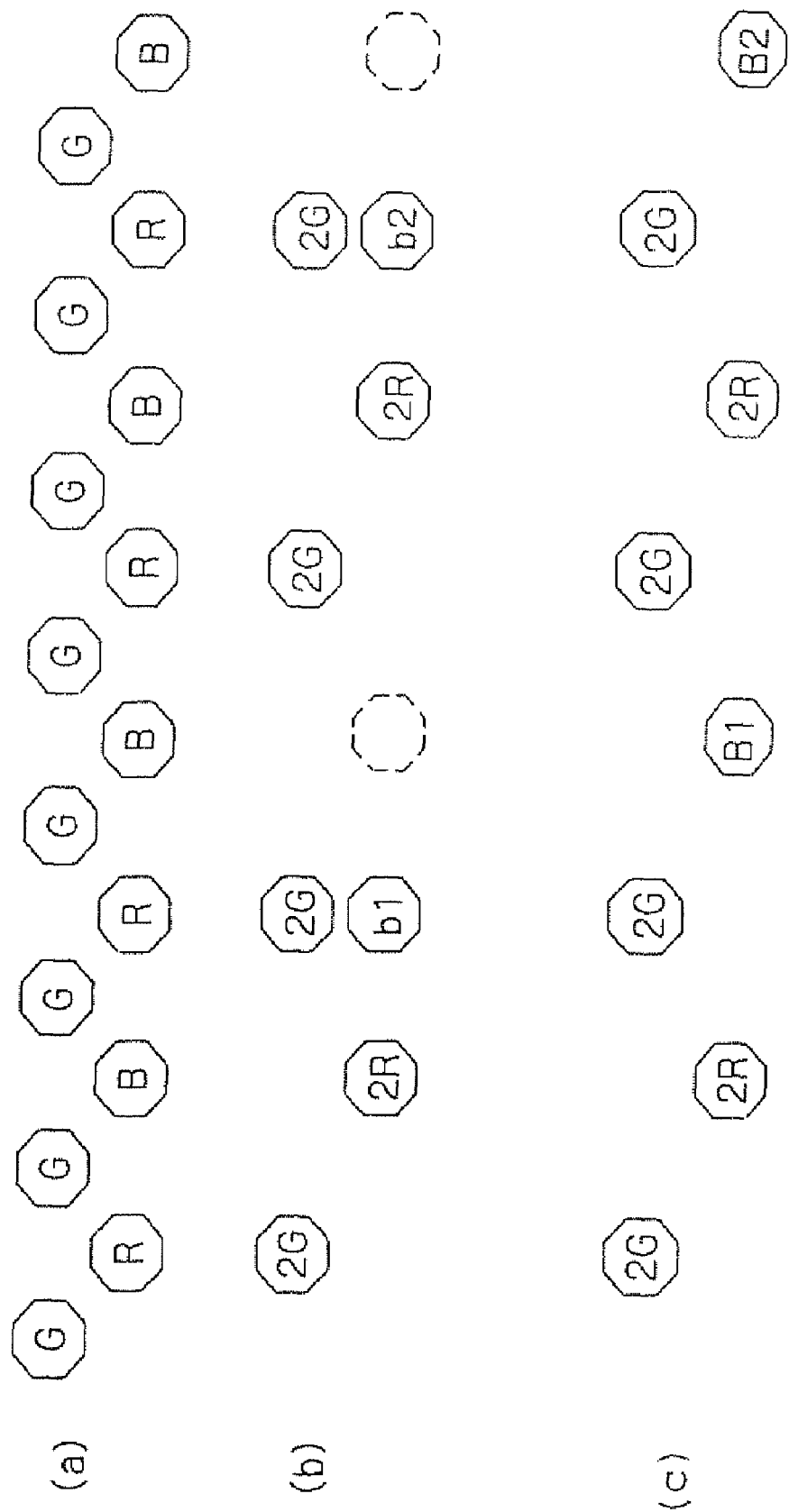
FIG. 26 shows part of the G square, RB full-checker pattern of FIG. 2 in upper part (a), the positions of pixels generated by the horizontal mixture of the pattern in middle part (b), and corrected pixel positions in lower part (c)

The operation of the color shift correcting circuit will be described more specifically hereinafter. The color filter 16b of the image pickup section 16 is provided with a G square, RB full-checker pattern shown in FIG. 26, upper part (a). FIG. 26, upper part (a), shows only two rows of color filter segments for facilitating an understanding of the image processing method. FIG. 26, middle part (b), shows the arrangement of image data produced by horizontal mixture effected with the pattern of FIG. 26, upper part (a), without giving consideration to color shift. As shown, B signal charges 2B are generated at positions represented by pixels b1 and b2 despite that they should be generated at positions represented by phantom octagons.

The color shift correcting circuit calculates pixel data as pixel data B1 and B2 to appear at the expected positions shown in FIG. 26, lower part (c). For calculation, the color shift correcting circuit uses the color-shifted pixel data b1 and b2 derived from horizontal mixture and the spatial distances between the pixel data B1 and the pixel data b1 and b2. The spatial distances are used as interpolation coefficients.

As for a spatial distance, the distance or pitch between nearby pixels in the horizontal direction is assumed to be "1". Then, the spatial distance between the pixel data B1 and b1 is "1" while the spatial distance between the pixel data B1 and b2 are "3". Also, the spatial distance between the pixel data b1 and b2 is "4". The pixel data B1 is therefore produced by (b1×3+b2×1)/4. In this manner, by using shifted pixel data positioned at both sides of the expected position on the same row and derived from horizontal mixture and spatial distances, it is possible to generate pixel data at the expected position by addition and averaging.

By effecting simple horizontal mixture, as distinguished from thinning horizontal mixture giving consideration to color shift, the camera 10 can read signal charges out of the image sensor 16c in a shorter period of time than the comparative example and does not need any hardware for signal level adjustment. However, color shift exists in the positional relation between the signal charges read out. To obviate the color shift, the signal processor 22 performs addition and averaging with the pixel data shifted from the expected positions in the right-and-left direction by using the spatial distances as coefficients, thereby generating the original pixel data. By using the method that executes correction on the basis of the pixel data read out, it is possible to flexibly cope with rapid read-out of signal charges and therefore to realize accurate image reproduction. It follows that the camera 10 is capable of directly writing the horizontally mixed pixel data in the storage 28 and then generating luminance data and color difference data later.

The thinning horizontal mixture is useful not only for sill pictures and movies, as shown and described, but also for electronic zooming. FIG. 27 shows a specific configuration of the image pickup section 16 for outputting a picture 300 having 3,000×4,000 pixels, i.e. 12,000,000 pixels in total. Because the monitor 30 does not have such a large number of pixels, the picture 300 is usually thinned to a 640×480 (VGA (Video Graphic Array)) picture 400 and then displayed on the monitor 30. In the movie mode, the signal charges are thinned by being read out by horizontal mixture. In this case, the number of pixels is so many, that the deterioration of image quality is not conspicuous. However, when a narrow region 410 included in the thinned picture 400 is enlarged by electronic zooming, the deterioration of image quality is apt to be conspicuous in an enlarged picture 500 subjected to horizontal mixture.

To obviate the deterioration of image quality, the thinning horizontal mixture scheme unique to the present invention is applied such that even when horizontal thinning is effected with the enlarged picture 500, the picture is read out in such a manner as to preserve the original color filter pattern. This successfully reduces false colors for thereby insuring high image quality. Selection is made between the horizontal mixture and the thinning horizontal mixture in accordance with magnification. For example, when the display screen size of the monitor 30 accords to the VGA, a magnification establishing a picture substantially equal to the VGA in number of pixels, i.e. the unity, is used as a threshold between the horizontal mixture and the thinning horizontal mixture; thinning horizontal mixture is selected when the magnification exceed unity. The camera 10 so operated is capable of maintaining high image quality without regard to the size of a picture to be displayed on the monitor 30 in the movie mode.

As stated above, thinning horizontal mixture is advantageous over horizontal mixture, which gives consideration to color shift as in the comparative example, in that it omits the sequential shift of the signal charges causative of color shift as far as the desired positions, thereby reducing the signal charge reading time. More specifically, horizontal thinning can be executed by distinguishing electrodes and giving consideration to color shift or by sweeping out the signal charges causative of color shift to the horizontal drains arranged in parallel to the horizontal transfer registers. The latter scheme is more flexible than the former scheme because it allows thinning positions to be varied in accordance with the kind of the color filter or the configuration of the unit block.

In any case, signal charges directly read out are theoretically lower than signal charges subjected to horizontal mixture. The signal charges directly read out are therefore adjusted in level in order to improve the balance of a picture, so that a still picture or a movie is freed from the deterioration of image quality.

Further, the procedure that executes horizontal mixture and then generates desired pixel data by using color-shifted pixel data positioned at the right and left of the desired pixel data is superior to the comparative example in that it saves the signal charge reading time while insuring high image quality free from color shift. In addition, correction effected after read-out makes it possible to flexibly cope with read-out without regard to the specific manner of horizontal mixture.

Moreover, as for display on the monitor, horizontal mixture or thinning horizontal mixture is selectively executed by using the display size of the monitor as a ×1 magnification. Therefore, even when part of a picture is enlarged by electronic zooming, it can be displayed on the monitor with high image quality.

In summary, it will be seen that the present invention provides a solid-state image pickup apparatus and a signal reading method for the same capable of saving a charge signal reading time, compared to a conventional procedure giving consideration to color shift, and insuring still pictures and movies with high quality free from false colors. Further, it is possible to flexibly cope with the read-out of signal charges. Moreover, because color shift is corrected after the read-out of signal charges, pixel data read out can be flexibly dealt with without influencing the signal reading.

The entire disclosure of Japanese patent application No. 2002-61547 filed on Mar. 7, 2002, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What I claim is:

1. A solid-state image pickup apparatus comprising:
   a solid-state image sensor comprising:
   a color filter having a plurality of color filter segments arranged in a pattern for separating light incident from a scene into respective colors;
   a plurality of photosensitive cells associated one-to-one with said plurality of color filter segments each for photoelectrically transducing the light transmitted through an associated color filter segment to thereby generate a corresponding signal charge, said photosensitive cells being shifted from each other by half a pitch in the horizontal and vertical directions;
   a plurality of gates each being configured to be selectively closed for storing the signal charge having a color attribute corresponding to particular one of the plurality of color filter segments in associated one of said plurality of photosensitive cells or opened for reading out said signal charge;
   a plurality of first transfer devices adjoining said plurality of gates for vertically transferring the signal charges via said plurality of gates;
   a second transfer device transferring the signal charges in a horizontal direction perpendicular to said plurality of first transfer devices; and
   a charge holding circuit intervening between bottom stages of said plurality of first transfer devices and said second transfer device for temporarily storing the signal charges fed from said bottom stages;
   a drive signal generator generating drive signals for selectively opening or closing said gates, drive signals for said plurality of first transfer devices and said second transfer device, read signals for reading out the signal charges held in said charge holding circuit, and drive signals for mixing, in the horizontal direction, the signal charges having a same color attribute arranged in a direction of row; and
   a signal processor digitizing an analog signal output from said solid-state image sensor and subjected to horizontal mixture as pixels and interpolate, among resulting pixel data, pixel data shifted in position and making a color pattern different in said horizontal direction from the pattern of said color filter when subjected to said horizontal mixture by using pixel data identical in color with said pixel data shifted and positioned at right and left of said pixel data shifted in position, wherein pixel data on column different from said color filter pattern in each block containing the plurality of color filter segments are not subjected to horizontal mixture.

2. The apparatus in accordance with claim 1, wherein said signal processor uses spatial distances between the pixel data shifted in position and the pixel data positioned at the right and the left of said pixel data as interpolation coefficients.

3. An image processing method comprising:
a first step of separating light incident from a scene being picked up into color components with a pattern, photoelectrically transducing said color components to thereby generate signal charges each having a particular color attribute using photosensitive cells shifted from each other by half pitch in the horizontal and vertical directions, and executing horizontal mixture for mixing the signal charges having a same color attribute in a horizontal direction; and
a second step of digitizing an analog signal output by the horizontal mixture as pixels and interpolating, among resulting pixel data, pixel data shifted in position and making a color pattern different in said horizontal direction from the pattern of said color filter when subjected to said horizontal mixture in correct positions by using pixel data identical in color with said pixel data shifted and positioned at right and left of said pixel data shifted in position, wherein pixel data on column different from said color filter pattern in each block containing a plurality of color filter segments are not subjected to horizontal mixture.

4. The method in accordance with claim 3, wherein said second step uses spatial distances between the pixel data shifted in position and the pixel data positioned at the right and the left of said pixel data as interpolation coefficients.

* * * * *